United States Patent
Tierney

(10) Patent No.: US 10,432,851 B2
(45) Date of Patent: Oct. 1, 2019

(54) WEARABLE COMPUTING DEVICE FOR DETECTING PHOTOGRAPHY

(71) Applicant: Toyota Motor Engineering & Manufacturing North America, Inc., Erlanger, KY (US)

(72) Inventor: John Tierney, Georgetown, KY (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 462 days.

(21) Appl. No.: 15/338,210

(22) Filed: Oct. 28, 2016

(65) Prior Publication Data

US 2018/0124309 A1  May 3, 2018

(51) Int. Cl.
| | |
|---|---|
| *H04N 5/232* | (2006.01) |
| *G06F 1/16* | (2006.01) |
| *G09B 21/00* | (2006.01) |
| *H04N 5/225* | (2006.01) |

(Continued)

(52) U.S. Cl.
CPC ......... *H04N 5/23222* (2013.01); *G03B 17/56* (2013.01); *G06F 1/163* (2013.01); *G06T 7/70* (2017.01); *G09B 21/003* (2013.01); *G09B 21/006* (2013.01); *G09B 21/007* (2013.01);
(Continued)

(58) Field of Classification Search
CPC ............. H04N 5/23222; H04N 5/2252; H04N 5/2256; G09B 21/007; G09B 21/003; G09B 21/006; G06F 1/163; G06T 7/70; G03B 17/56
See application file for complete search history.

(56) References Cited

U.S. PATENT DOCUMENTS

| | | |
|---|---|---|
| 4,520,501 A | 5/1985 | DuBrucq |
| 4,586,827 A | 5/1986 | Hirsch et al. |
| 4,786,966 A | 11/1988 | Hanson |

(Continued)

FOREIGN PATENT DOCUMENTS

| | | |
|---|---|---|
| CN | 201260746 | 6/2009 |
| CN | 101527093 | 9/2009 |

(Continued)

OTHER PUBLICATIONS

Zhang, Shanjun; Yoshino, Kazuyoshi; A Braille Recognition System by the Mobile Phone with Embedded Camera; 2007; IEEE.

(Continued)

*Primary Examiner* — Oschta I Montoya
(74) *Attorney, Agent, or Firm* — Snell & Wilmer LLP

(57) ABSTRACT

A wearable computing device for detecting photography includes an outer casing configured to be worn by a user. The wearable computing device also includes a device camera coupled to the outer casing. The device camera is designed to detect image data corresponding to a person holding a remote camera in an environment of the wearable computing device. The wearable computing device also includes a mobile processor coupled to the device camera. The mobile processor is designed to determine that a photograph will be taken based on the image data corresponding to the person holding the remote camera. The wearable computing device also includes an output device coupled to the mobile processor. The output device is designed to output data indicating that the photograph of the wearable computing device will be taken.

16 Claims, 7 Drawing Sheets

(51) Int. Cl.
  *G06T 7/70* (2017.01)
  *G03B 17/56* (2006.01)
(52) U.S. Cl.
  CPC ......... *H04N 5/2252* (2013.01); *H04N 5/2256* (2013.01)

(56) References Cited

U.S. PATENT DOCUMENTS

| | | |
|---|---|---|
| 5,047,952 A | 9/1991 | Kramer |
| 5,097,856 A | 3/1992 | Chi-Sheng |
| 5,129,716 A | 7/1992 | Holakovszky et al. |
| 5,233,520 A | 8/1993 | Kretsch et al. |
| 5,265,272 A | 11/1993 | Kurcbart |
| 5,463,428 A | 10/1995 | Lipton et al. |
| 5,508,699 A | 4/1996 | Silverman |
| 5,539,665 A | 7/1996 | Lamming et al. |
| 5,543,802 A | 8/1996 | Villevieille et al. |
| 5,544,050 A | 8/1996 | Abe |
| 5,568,127 A | 10/1996 | Bang |
| 5,636,038 A | 6/1997 | Lynt |
| 5,659,764 A | 8/1997 | Sakiyama |
| 5,701,356 A | 12/1997 | Stanford et al. |
| 5,733,127 A | 3/1998 | Mecum |
| 5,807,111 A | 9/1998 | Schrader |
| 5,872,744 A | 2/1999 | Taylor |
| 5,953,693 A | 9/1999 | Sakiyama |
| 5,956,630 A | 9/1999 | Mackey |
| 5,982,286 A | 11/1999 | Vanmoor |
| 6,009,577 A | 1/2000 | Day |
| 6,055,048 A | 4/2000 | Langevin et al. |
| 6,067,112 A | 5/2000 | Wellner et al. |
| 6,199,010 B1 | 3/2001 | Richton |
| 6,229,901 B1 | 5/2001 | Mickelson et al. |
| 6,230,135 B1 | 5/2001 | Ramsay |
| 6,230,349 B1 | 5/2001 | Silver et al. |
| 6,285,757 B1 | 9/2001 | Carroll et al. |
| 6,307,526 B1 | 10/2001 | Mann |
| 6,323,807 B1 | 11/2001 | Golding et al. |
| 6,349,001 B1 | 2/2002 | Spitzer |
| 6,466,232 B1 | 10/2002 | Newell et al. |
| 6,477,239 B1 | 11/2002 | Ohki |
| 6,542,623 B1 | 4/2003 | Kahn |
| 6,580,999 B2 | 6/2003 | Maruyama et al. |
| 6,594,370 B1 | 7/2003 | Anderson |
| 6,603,863 B1 | 8/2003 | Nagayoshi |
| 6,619,836 B1 | 9/2003 | Silvant et al. |
| 6,701,296 B1 | 3/2004 | Kramer |
| 6,774,788 B1 | 8/2004 | Balfe |
| 6,825,875 B1 | 11/2004 | Strub et al. |
| 6,826,477 B2 | 11/2004 | Ladetto et al. |
| 6,834,373 B2 | 12/2004 | Dieberger |
| 6,839,667 B2 | 1/2005 | Reich |
| 6,857,775 B1 | 2/2005 | Wilson |
| 6,920,229 B2 | 7/2005 | Boesen |
| D513,997 S | 1/2006 | Wilson |
| 7,027,874 B1 | 4/2006 | Sawan et al. |
| D522,300 S | 6/2006 | Roberts |
| 7,069,215 B1 | 6/2006 | Bangalore |
| 7,106,220 B2 | 9/2006 | Gourgey et al. |
| 7,228,275 B1 | 6/2007 | Endo |
| 7,299,034 B2 | 11/2007 | Kates |
| 7,308,314 B2 | 12/2007 | Havey et al. |
| 7,336,226 B2 | 2/2008 | Jung et al. |
| 7,356,473 B2 | 4/2008 | Kates |
| 7,413,554 B2 | 8/2008 | Kobayashi et al. |
| 7,417,592 B1 | 8/2008 | Hsiao et al. |
| 7,428,429 B2 | 9/2008 | Gantz et al. |
| 7,463,188 B1 | 12/2008 | McBurney |
| 7,496,445 B2 | 2/2009 | Mohsini et al. |
| 7,501,958 B2 | 3/2009 | Saltzstein et al. |
| 7,525,568 B2 | 4/2009 | Raghunath |
| 7,564,469 B2 | 7/2009 | Cohen |
| 7,565,295 B1 | 7/2009 | Hernandez-Rebollar |
| 7,598,976 B2 | 10/2009 | Sofer et al. |
| 7,618,260 B2 | 11/2009 | Daniel et al. |
| D609,818 S | 2/2010 | Tsang et al. |
| 7,656,290 B2 | 2/2010 | Fein et al. |
| 7,659,915 B2 | 2/2010 | Kurzweil et al. |
| 7,743,996 B2 | 6/2010 | Maciver |
| D625,427 S | 10/2010 | Lee |
| 7,843,351 B2 | 11/2010 | Bourne |
| 7,843,488 B2 | 11/2010 | Stapleton |
| 7,848,512 B2 | 12/2010 | Eldracher |
| 7,864,991 B2 | 1/2011 | Espenlaub et al. |
| 7,938,756 B2 | 5/2011 | Rodetsky et al. |
| 7,991,576 B2 | 8/2011 | Roumeliotis |
| 8,005,263 B2 | 8/2011 | Fujimura |
| 8,035,519 B2 | 10/2011 | Davis |
| D649,655 S | 11/2011 | Petersen |
| 8,123,660 B2 | 2/2012 | Kruse et al. |
| D656,480 S | 3/2012 | McManigal et al. |
| 8,138,907 B2 | 3/2012 | Barbeau et al. |
| 8,150,107 B2 | 4/2012 | Kurzweil et al. |
| 8,177,705 B2 | 5/2012 | Abolfathi |
| 8,239,032 B2 | 8/2012 | Dewhurst |
| 8,253,760 B2 | 8/2012 | Sako et al. |
| 8,300,862 B2 | 10/2012 | Newton et al. |
| 8,325,263 B2 | 12/2012 | Kato et al. |
| D674,501 S | 1/2013 | Petersen |
| 8,359,122 B2 | 1/2013 | Koselka et al. |
| 8,395,968 B2 | 3/2013 | Vartanian et al. |
| 8,401,785 B2 | 3/2013 | Cho et al. |
| 8,414,246 B2 | 4/2013 | Tobey |
| 8,418,705 B2 | 4/2013 | Ota et al. |
| 8,428,643 B2 | 4/2013 | Lin |
| 8,483,956 B2 | 7/2013 | Zhang |
| 8,494,507 B1 | 7/2013 | Tedesco et al. |
| 8,494,859 B2 | 7/2013 | Said |
| 8,538,687 B2 | 9/2013 | Plocher et al. |
| 8,538,688 B2 | 9/2013 | Prehofer |
| 8,571,860 B2 | 10/2013 | Strope |
| 8,583,282 B2 | 11/2013 | Angle et al. |
| 8,588,464 B2 | 11/2013 | Albertson et al. |
| 8,588,972 B2 | 11/2013 | Fung |
| 8,591,412 B2 | 11/2013 | Kovarik et al. |
| 8,594,935 B2 | 11/2013 | Cioffi et al. |
| 8,606,316 B2 | 12/2013 | Evanitsky |
| 8,610,879 B2 | 12/2013 | Ben-Moshe et al. |
| 8,630,633 B1 | 1/2014 | Tedesco et al. |
| 8,676,274 B2 | 3/2014 | Li |
| 8,676,623 B2 | 3/2014 | Gale et al. |
| 8,694,251 B2 | 4/2014 | Janardhanan et al. |
| 8,704,902 B2 | 4/2014 | Naick et al. |
| 8,718,672 B2 | 5/2014 | Xie et al. |
| 8,743,145 B1 | 6/2014 | Price |
| 8,750,898 B2 | 6/2014 | Haney |
| 8,768,071 B2 | 7/2014 | Tsuchinaga et al. |
| 8,786,680 B2 | 7/2014 | Shiratori et al. |
| 8,797,141 B2 | 8/2014 | Best et al. |
| 8,797,386 B2 | 8/2014 | Chou et al. |
| 8,803,699 B2 | 8/2014 | Foshee et al. |
| 8,805,929 B2 | 8/2014 | Erol et al. |
| 8,812,244 B2 | 8/2014 | Angelides |
| 8,814,019 B2 | 8/2014 | Dyster et al. |
| 8,825,398 B2 | 9/2014 | Alexandre et al. |
| 8,836,532 B2 | 9/2014 | Fish, Jr. et al. |
| 8,836,580 B2 | 9/2014 | Mendelson |
| 8,836,910 B2 | 9/2014 | Cashin et al. |
| 8,902,303 B2 | 12/2014 | Na'Aman et al. |
| 8,909,534 B1 | 12/2014 | Heath |
| D721,673 S | 1/2015 | Park et al. |
| 8,926,330 B2 | 1/2015 | Taghavi |
| 8,930,458 B2 | 1/2015 | Lewis et al. |
| 8,981,682 B2 | 3/2015 | Delson et al. |
| 8,994,498 B2 | 3/2015 | Agrafioti |
| D727,194 S | 4/2015 | Wilson |
| 9,004,330 B2 | 4/2015 | White |
| 9,025,016 B2 | 5/2015 | Wexler et al. |
| 9,042,596 B2 | 5/2015 | Connor |
| 9,053,094 B2 | 6/2015 | Yassa |
| 9,076,450 B1 | 7/2015 | Sadek et al. |
| 9,081,079 B2 | 7/2015 | Chao et al. |
| 9,081,385 B1 | 7/2015 | Ferguson et al. |
| D736,741 S | 8/2015 | Katz |

(56) References Cited

U.S. PATENT DOCUMENTS

| | | |
|---|---|---|
| 9,111,545 B2 | 8/2015 | Jadhav et al. |
| D738,238 S | 9/2015 | Pede et al. |
| 9,137,484 B2 | 9/2015 | DiFrancesco et al. |
| 9,137,639 B2 | 9/2015 | Garin et al. |
| 9,140,554 B2 | 9/2015 | Jerauld |
| 9,148,191 B2 | 9/2015 | Teng et al. |
| 9,158,378 B2 | 10/2015 | Hirukawa |
| D742,535 S | 11/2015 | Wu |
| D743,933 S | 11/2015 | Park et al. |
| 9,185,489 B2 | 11/2015 | Gerber et al. |
| 9,190,058 B2 | 11/2015 | Klein |
| 9,104,806 B2 | 12/2015 | Stivoric et al. |
| 9,230,430 B2 | 1/2016 | Civelli et al. |
| 9,232,366 B1 | 1/2016 | Charlier et al. |
| 9,267,801 B2 | 2/2016 | Gupta et al. |
| 9,269,015 B2 | 2/2016 | Boncyk et al. |
| 9,275,376 B2 | 3/2016 | Barraclough et al. |
| 9,304,588 B2 | 4/2016 | Aldossary |
| D756,958 S | 5/2016 | Lee et al. |
| D756,959 S | 5/2016 | Lee et al. |
| 9,335,175 B2 | 5/2016 | Zhang et al. |
| 9,341,014 B2 | 5/2016 | Oshima et al. |
| 9,355,547 B2 | 5/2016 | Stevens et al. |
| 2001/0023387 A1 | 9/2001 | Rollo |
| 2002/0067282 A1 | 6/2002 | Moskowitz et al. |
| 2002/0071277 A1 | 6/2002 | Starner et al. |
| 2002/0075323 A1 | 6/2002 | O'Dell |
| 2002/0173346 A1 | 11/2002 | Wang |
| 2002/0178344 A1 | 11/2002 | Bourget |
| 2003/0026461 A1 | 2/2003 | Hunter |
| 2003/0133008 A1 | 7/2003 | Stephenson |
| 2003/0133085 A1 | 7/2003 | Tretiakoff |
| 2003/0179133 A1 | 9/2003 | Pepin et al. |
| 2004/0056907 A1 | 3/2004 | Sharma |
| 2004/0232179 A1 | 11/2004 | Chauhan |
| 2004/0267442 A1 | 12/2004 | Fehr et al. |
| 2005/0208457 A1 | 9/2005 | Fink et al. |
| 2005/0221260 A1 | 10/2005 | Kikuchi |
| 2005/0259035 A1 | 11/2005 | Iwaki |
| 2005/0283752 A1 | 12/2005 | Fruchter |
| 2006/0004512 A1 | 1/2006 | Herbst et al. |
| 2006/0028550 A1 | 2/2006 | Palmer, Jr. et al. |
| 2006/0029256 A1 | 2/2006 | Miyoshi et al. |
| 2006/0129308 A1 | 6/2006 | Kates |
| 2006/0171704 A1 | 8/2006 | Bingle et al. |
| 2006/0177086 A1 | 8/2006 | Rye et al. |
| 2006/0184318 A1 | 8/2006 | Yoshimine |
| 2006/0292533 A1 | 12/2006 | Selod |
| 2007/0001904 A1 | 1/2007 | Mendelson |
| 2007/0052672 A1 | 3/2007 | Ritter et al. |
| 2007/0173688 A1 | 7/2007 | Kim |
| 2007/0182812 A1 | 8/2007 | Ritchey |
| 2007/0202865 A1 | 8/2007 | Moride |
| 2007/0230786 A1 | 10/2007 | Foss |
| 2007/0296572 A1 | 12/2007 | Fein et al. |
| 2008/0024594 A1 | 1/2008 | Ritchey |
| 2008/0068559 A1 | 3/2008 | Howell et al. |
| 2008/0120029 A1 | 5/2008 | Zelek et al. |
| 2008/0144854 A1 | 6/2008 | Abreu |
| 2008/0145822 A1 | 6/2008 | Bucchieri |
| 2008/0174676 A1 | 7/2008 | Squilla et al. |
| 2008/0198222 A1 | 8/2008 | Gowda |
| 2008/0198324 A1 | 8/2008 | Fuziak |
| 2008/0208455 A1 | 8/2008 | Hartman |
| 2008/0251110 A1 | 10/2008 | Pede |
| 2008/0260210 A1 | 10/2008 | Kobeli |
| 2009/0012788 A1 | 1/2009 | Gilbert |
| 2009/0040215 A1 | 2/2009 | Afzulpurkar |
| 2009/0058611 A1 | 3/2009 | Kawamura |
| 2009/0106016 A1 | 4/2009 | Athsani |
| 2009/0118652 A1 | 5/2009 | Carlucci |
| 2009/0122161 A1 | 5/2009 | Bolkhovitinov |
| 2009/0122648 A1 | 5/2009 | Mountain et al. |
| 2009/0157302 A1 | 6/2009 | Tashev et al. |
| 2009/0177437 A1 | 7/2009 | Roumeliotis |
| 2009/0189974 A1 | 7/2009 | Deering |
| 2009/0210596 A1 | 8/2009 | Furuya |
| 2010/0041378 A1 | 2/2010 | Aceves et al. |
| 2010/0080418 A1 | 4/2010 | Ito |
| 2010/0109918 A1 | 5/2010 | Liebermann |
| 2010/0110368 A1 | 5/2010 | Chaum |
| 2010/0179452 A1 | 7/2010 | Srinivasan |
| 2010/0182242 A1 | 7/2010 | Fields et al. |
| 2010/0182450 A1 | 7/2010 | Kumar et al. |
| 2010/0198494 A1 | 8/2010 | Chao et al. |
| 2010/0199232 A1 | 8/2010 | Mistry et al. |
| 2010/0241350 A1 | 9/2010 | Cioffi et al. |
| 2010/0245585 A1 | 9/2010 | Fisher et al. |
| 2010/0267276 A1 | 10/2010 | Wu et al. |
| 2010/0292917 A1 | 11/2010 | Emam et al. |
| 2010/0298976 A1 | 11/2010 | Sugihara et al. |
| 2010/0305845 A1 | 12/2010 | Alexandre et al. |
| 2010/0308999 A1 | 12/2010 | Chornenky |
| 2011/0066383 A1 | 3/2011 | Jangle et al. |
| 2011/0071830 A1 | 3/2011 | Kim |
| 2011/0092249 A1 | 4/2011 | Evanitsky |
| 2011/0124383 A1 | 5/2011 | Garra et al. |
| 2011/0125735 A1 | 5/2011 | Petrou |
| 2011/0181422 A1 | 7/2011 | Tran |
| 2011/0187640 A1 | 8/2011 | Jacobsen et al. |
| 2011/0211760 A1 | 9/2011 | Boncyk et al. |
| 2011/0216006 A1 | 9/2011 | Litschel |
| 2011/0221670 A1 | 9/2011 | King, III et al. |
| 2011/0234584 A1 | 9/2011 | Endo |
| 2011/0246064 A1 | 10/2011 | Nicholson |
| 2011/0260681 A1 | 10/2011 | Guccione et al. |
| 2011/0307172 A1 | 12/2011 | Jadhav et al. |
| 2012/0016578 A1 | 1/2012 | Coppens |
| 2012/0053826 A1 | 3/2012 | Slamka |
| 2012/0062357 A1 | 3/2012 | Slamka |
| 2012/0069511 A1 | 3/2012 | Azera |
| 2012/0075168 A1 | 3/2012 | Osterhout et al. |
| 2012/0082962 A1 | 4/2012 | Schmidt |
| 2012/0085377 A1 | 4/2012 | Trout |
| 2012/0092161 A1 | 4/2012 | West |
| 2012/0092460 A1 | 4/2012 | Mahoney |
| 2012/0123784 A1 | 5/2012 | Baker et al. |
| 2012/0136666 A1 | 5/2012 | Corpier et al. |
| 2012/0143495 A1 | 6/2012 | Dantu |
| 2012/0162423 A1 | 6/2012 | Xiao et al. |
| 2012/0194552 A1 | 8/2012 | Osterhout et al. |
| 2012/0206335 A1 | 8/2012 | Osterhout et al. |
| 2012/0206607 A1 | 8/2012 | Morioka |
| 2012/0207356 A1 | 8/2012 | Murphy |
| 2012/0214418 A1 | 8/2012 | Lee et al. |
| 2012/0220234 A1 | 8/2012 | Abreu |
| 2012/0232430 A1 | 9/2012 | Boissy et al. |
| 2012/0249797 A1 | 10/2012 | Haddick et al. |
| 2012/0252483 A1 | 10/2012 | Farmer et al. |
| 2012/0316884 A1 | 12/2012 | Rozaieski et al. |
| 2012/0323485 A1 | 12/2012 | Mutoh |
| 2012/0327194 A1 | 12/2012 | Shiratori |
| 2013/0002452 A1 | 1/2013 | Lauren |
| 2013/0044005 A1 | 2/2013 | Foshee et al. |
| 2013/0046541 A1 | 2/2013 | Klein et al. |
| 2013/0066636 A1 | 3/2013 | Singhal |
| 2013/0079061 A1 | 3/2013 | Jadhav |
| 2013/0090133 A1 | 4/2013 | D'Jesus Bencci |
| 2013/0115578 A1 | 5/2013 | Shiina |
| 2013/0115579 A1 | 5/2013 | Taghavi |
| 2013/0116559 A1 | 5/2013 | Levin et al. |
| 2013/0127980 A1 | 5/2013 | Haddick |
| 2013/0128051 A1 | 5/2013 | Velipasalar et al. |
| 2013/0131985 A1 | 5/2013 | Weiland et al. |
| 2013/0141576 A1 | 6/2013 | Lord et al. |
| 2013/0144629 A1 | 6/2013 | Johnston |
| 2013/0155474 A1 | 6/2013 | Roach et al. |
| 2013/0157230 A1 | 6/2013 | Morgan |
| 2013/0184982 A1 | 7/2013 | DeLuca et al. |
| 2013/0201344 A1 | 8/2013 | Sweet, III |
| 2013/0202274 A1 | 8/2013 | Chan |
| 2013/0204605 A1 | 8/2013 | Illgner-Fehns |
| 2013/0211718 A1 | 8/2013 | Yoo et al. |
| 2013/0218456 A1 | 8/2013 | Zelek et al. |

(56) References Cited

U.S. PATENT DOCUMENTS

| | | |
|---|---|---|
| 2013/0228615 A1 | 9/2013 | Gates et al. |
| 2013/0229669 A1 | 9/2013 | Smits |
| 2013/0243250 A1 | 9/2013 | France |
| 2013/0245396 A1 | 9/2013 | Berman et al. |
| 2013/0250078 A1 | 9/2013 | Levy |
| 2013/0250233 A1 | 9/2013 | Blum et al. |
| 2013/0253818 A1 | 9/2013 | Sanders et al. |
| 2013/0265450 A1 | 10/2013 | Barnes, Jr. |
| 2013/0271584 A1 | 10/2013 | Wexler et al. |
| 2013/0290909 A1 | 10/2013 | Gray |
| 2013/0307842 A1 | 11/2013 | Grinberg et al. |
| 2013/0311179 A1 | 11/2013 | Wagner |
| 2013/0328683 A1 | 12/2013 | Sitbon et al. |
| 2013/0332452 A1 | 12/2013 | Jarvis |
| 2014/0009561 A1 | 1/2014 | Sutherland et al. |
| 2014/0031081 A1 | 1/2014 | Vossoughi et al. |
| 2014/0031977 A1 | 1/2014 | Goldenberg et al. |
| 2014/0032596 A1 | 1/2014 | Fish et al. |
| 2014/0037149 A1 | 2/2014 | Zetune |
| 2014/0055353 A1 | 2/2014 | Takahama |
| 2014/0071234 A1 | 3/2014 | Millett |
| 2014/0081631 A1 | 3/2014 | Zhu et al. |
| 2014/0085446 A1 | 3/2014 | Hicks |
| 2014/0098018 A1 | 4/2014 | Kim et al. |
| 2014/0100773 A1 | 4/2014 | Cunningham et al. |
| 2014/0125700 A1 | 5/2014 | Ramachandran et al. |
| 2014/0132388 A1 | 5/2014 | Alalawi |
| 2014/0133290 A1 | 5/2014 | Yokoo |
| 2014/0160250 A1 | 6/2014 | Pomerantz |
| 2014/0184384 A1 | 7/2014 | Zhu et al. |
| 2014/0184775 A1 | 7/2014 | Drake |
| 2014/0204245 A1 | 7/2014 | Wexler |
| 2014/0222023 A1 | 8/2014 | Kim et al. |
| 2014/0233859 A1 | 8/2014 | Cho |
| 2014/0236932 A1 | 8/2014 | Ikonomov |
| 2014/0249847 A1 | 9/2014 | Soon-Shiong |
| 2014/0251396 A1 | 9/2014 | Subhashrao et al. |
| 2014/0253702 A1 | 9/2014 | Wexler et al. |
| 2014/0278070 A1 | 9/2014 | McGavran et al. |
| 2014/0281943 A1 | 9/2014 | Prilepov |
| 2014/0287382 A1 | 9/2014 | Villar Cloquell |
| 2014/0309806 A1 | 10/2014 | Ricci |
| 2014/0313040 A1 | 10/2014 | Wright, Sr. |
| 2014/0335893 A1 | 11/2014 | Ronen |
| 2014/0343846 A1 | 11/2014 | Goldman et al. |
| 2014/0345956 A1 | 11/2014 | Kojina |
| 2014/0347265 A1 | 11/2014 | Aimone |
| 2014/0368412 A1 | 12/2014 | Jacobsen et al. |
| 2014/0369541 A1 | 12/2014 | Miskin et al. |
| 2014/0369627 A1* | 12/2014 | Huang ............ G06T 5/50 382/309 |
| 2014/0379251 A1 | 12/2014 | Tolstedt |
| 2014/0379336 A1 | 12/2014 | Bhatnager |
| 2015/0002808 A1 | 1/2015 | Rizzo, III et al. |
| 2015/0016035 A1 | 1/2015 | Tussy |
| 2015/0049487 A1* | 2/2015 | Connor ............ F21V 33/0076 362/277 |
| 2015/0058237 A1 | 2/2015 | Bailey |
| 2015/0063661 A1 | 3/2015 | Lee |
| 2015/0081884 A1 | 3/2015 | Maguire |
| 2015/0099946 A1 | 4/2015 | Sahin |
| 2015/0109107 A1 | 4/2015 | Gomez et al. |
| 2015/0120186 A1 | 4/2015 | Heikes |
| 2015/0125831 A1 | 5/2015 | Chandrashekhar Nair et al. |
| 2015/0135310 A1 | 5/2015 | Lee |
| 2015/0141085 A1 | 5/2015 | Nuovo et al. |
| 2015/0142891 A1 | 5/2015 | Haque et al. |
| 2015/0154643 A1 | 6/2015 | Artman et al. |
| 2015/0196101 A1 | 7/2015 | Dayal et al. |
| 2015/0198454 A1 | 7/2015 | Moore et al. |
| 2015/0198455 A1 | 7/2015 | Chen et al. |
| 2015/0199566 A1 | 7/2015 | Moore et al. |
| 2015/0201181 A1 | 7/2015 | Moore et al. |
| 2015/0211858 A1 | 7/2015 | Jerauld |
| 2015/0219757 A1 | 8/2015 | Boelter et al. |
| 2015/0223355 A1 | 8/2015 | Fleck |
| 2015/0256977 A1 | 9/2015 | Huang |
| 2015/0257555 A1 | 9/2015 | Wong |
| 2015/0260474 A1 | 9/2015 | Rublowsky et al. |
| 2015/0262509 A1 | 9/2015 | Labbe |
| 2015/0279172 A1 | 10/2015 | Hyde |
| 2015/0324646 A1 | 11/2015 | Kimia |
| 2015/0330787 A1 | 11/2015 | Cioffi et al. |
| 2015/0336276 A1 | 11/2015 | Song et al. |
| 2015/0338917 A1 | 11/2015 | Steiner et al. |
| 2015/0341591 A1 | 11/2015 | Kelder et al. |
| 2015/0346496 A1 | 12/2015 | Haddick et al. |
| 2015/0356345 A1 | 12/2015 | Velozo |
| 2015/0356837 A1 | 12/2015 | Pajestka et al. |
| 2015/0364943 A1 | 12/2015 | Vick et al. |
| 2015/0367176 A1 | 12/2015 | Bejestan |
| 2015/0375395 A1 | 12/2015 | Kwon et al. |
| 2016/0007158 A1 | 1/2016 | Venkatraman |
| 2016/0028917 A1 | 1/2016 | Wexler |
| 2016/0042228 A1 | 2/2016 | Opalka |
| 2016/0078289 A1 | 3/2016 | Michel |
| 2016/0098138 A1 | 4/2016 | Park |
| 2016/0156850 A1 | 6/2016 | Werblin et al. |
| 2016/0198319 A1 | 7/2016 | Huang |
| 2016/0350514 A1 | 12/2016 | Rajendran |

FOREIGN PATENT DOCUMENTS

| | | |
|---|---|---|
| CN | 201440733 | 4/2010 |
| CN | 101803988 | 8/2010 |
| CN | 101647745 | 1/2011 |
| CN | 102316193 | 1/2012 |
| CN | 102631280 | 8/2012 |
| CN | 202547659 | 11/2012 |
| CN | 202722736 | 2/2013 |
| CN | 102323819 | 6/2013 |
| CN | 103445920 | 12/2013 |
| DE | 102011080056 | 1/2013 |
| DE | 102012000587 | 7/2013 |
| DE | 102012202614 | 8/2013 |
| EP | 1174049 | 9/2004 |
| EP | 1721237 | 11/2006 |
| EP | 2368455 | 9/2011 |
| EP | 2371339 | 10/2011 |
| EP | 2127033 | 8/2012 |
| EP | 2581856 | 4/2013 |
| EP | 2751775 | 7/2016 |
| FR | 2885251 | 11/2006 |
| GB | 2401752 | 11/2004 |
| JP | 1069539 | 3/1998 |
| JP | 2001304908 | 10/2001 |
| JP | 2010012529 | 1/2010 |
| JP | 2010182193 | 8/2010 |
| JP | 4727352 | 7/2011 |
| JP | 2013169611 | 9/2013 |
| KR | 100405636 | 11/2003 |
| KR | 20080080688 | 9/2008 |
| KR | 20120020212 | 3/2012 |
| KR | 1250929 | 4/2013 |
| WO | WO 1995/004440 | 9/1995 |
| WO | WO 9949656 | 9/1999 |
| WO | WO 0010073 | 2/2000 |
| WO | WO 0038393 | 6/2000 |
| WO | WO 179956 | 10/2001 |
| WO | WO 2004/076974 | 9/2004 |
| WO | WO 2006/028354 | 3/2006 |
| WO | WO 2006/045819 | 5/2006 |
| WO | WO 2007/031782 | 3/2007 |
| WO | WO 2008/015375 | 2/2008 |
| WO | WO 2008/035993 | 3/2008 |
| WO | WO 2008/008791 | 4/2008 |
| WO | WO 2008/096134 | 8/2008 |
| WO | WO 2008/127316 | 10/2008 |
| WO | WO 2010/062481 | 6/2010 |
| WO | WO 2010/109313 | 9/2010 |
| WO | WO 2012/040703 | 3/2012 |
| WO | WO 2012/163675 | 12/2012 |
| WO | WO 2013/045557 | 4/2013 |
| WO | WO 2013/054257 | 4/2013 |

(56) References Cited

FOREIGN PATENT DOCUMENTS

| WO | WO 2013/067539 | 5/2013 |
|---|---|---|
| WO | WO 2013/147704 | 10/2013 |
| WO | WO 2014/104531 | 7/2014 |
| WO | WO 2014/138123 | 9/2014 |
| WO | WO 2014/172378 | 10/2014 |
| WO | WO 2015/065418 | 5/2015 |
| WO | WO 2015/092533 | 6/2015 |
| WO | WO 2015/108882 | 7/2015 |
| WO | WO 2015/127062 | 8/2015 |

OTHER PUBLICATIONS

Diallo, Amadou; Sep. 18, 2014; Apple iOS8: Top New Features, Forbes Magazine.

N. Kalar, T. Lawers, D. Dewey, T. Stepleton, M.B. Dias; Iterative Design of a Braille Writing Tutor to Combat Illiteracy; Aug. 30, 2007; IEEE.

AlZuhair et al.; "NFC Based Applications for Visually Impaired People—A Review"; IEEE International Conference on Multimedia and Expo Workshops (ICMEW), Jul. 14, 2014; 7 pages.

"Light Detector" EveryWare Technologies; 2 pages; Jun. 18, 2016.

Aggarwal et al.; "All-in-One Companion for Visually Impaired;" International Journal of Computer Applications; vol. 79, No. 14; pp. 37-40; Oct. 2013.

AppleVis; An Introduction to Braille Screen Input on iOS 8; http://www.applevis.com/guides/braille-ios/introduction-braille-screen-input-ios-8, Nov. 16, 2014; 7 pages.

Arati et al. "Object Recognition in Mobile Phone Application for Visually Impaired Users;" IOSR Journal of Computer Engineering (IOSR-JCE); vol. 17, No. 1; pp. 30-33; Jan. 2015.

Bharathi et al.; "Effective Navigation for Visually Impaired by Wearable Obstacle Avoidance System;" 2012 International Conference on Computing, Electronics and Electrical Technologies (ICCEET); pp. 956-958; 2012.

Bhatlawande et al.; "Way-finding Electronic Bracelet for Visually Impaired People"; IEEE Point-of-Care Healthcare Technologies (PHT), Jan. 16-18, 2013; 4 pages.

Bigham et al.; "VizWiz: Nearly Real-Time Answers to Visual Questions" Proceedings of the 23nd annual ACM symposium on User interface software and technology; 2010; 2 pages.

Blaze Engineering; "Visually Impaired Resource Guide: Assistive Technology for Students who use Braille"; Braille 'n Speak Manual; http://www.blaize.com; Nov. 17, 2014; 5 pages.

Blenkhorn et al.; "An Ultrasonic Mobility Device with Minimal Audio Feedback"; Center on Disabilities Technology and Persons with Disabilities Conference; Nov. 22, 1997; 5 pages.

Borenstein et al.; "The GuideCane—A Computerized Travel Aid for the Active Guidance of Blind Pedestrians"; IEEE International Conference on Robotics and Automation; Apr. 21-27, 1997; 6 pages.

Bujacz et al.; "Remote Guidance for the Blind—A Proposed Teleassistance System and Navigation Trials"; Conference on Human System Interactions; May 25-27, 2008; 6 pages.

Burbey et al.; "Human Information Processing with the Personal Memex"; ISE 5604 Fall 2005; Dec. 6, 2005; 88 pages.

Campos et al.; "Design and Evaluation of a Spoken-Feedback Keyboard"; Department of Information Systems and Computer Science, INESC-ID/IST/Universidade Tecnica de Lisboa, Jul. 2004; 6 pages.

Caperna et al.; "A Navigation and Object Location Device for the Blind"; Tech. rep. University of Maryland College Park; May 2009; 129 pages.

Cardonha et al.; "A Crowdsourcing Platform for the Construction of Accessibility Maps"; W4A'13 Proceedings of the 10th International Cross-Disciplinary Conference on Web Accessibility; Article No. 26; 2013; 5 pages.

Chaudary et al.; "Alternative Navigation Assistance Aids for Visually Impaired Blind Persons"; Proceedings of ICEAPVI; Feb. 12-14, 2015; 5 pages.

Coughlan et al.; "Crosswatch: A System for Providing Guidance to Visually Impaired Travelers at Traffic Intersections"; Journal of Assistive Technologies 7.2; 2013; 17 pages.

D'Andrea, Frances Mary; "More than a Perkins Brailler: A Review of the Mountbatten Brailler, Part 1"; AFB AccessWorld Magazine; vol. 6, No. 1, Jan. 2005; 9 pages.

De Choudhury et al. "Automatic Construction of Travel Itineraries Using Social Breadcrumbs," pp. 35-44; Jun. 2010.

Dias et al.; "Enhancing an Automated Braille Writing Tutor"; IEEE/RSJ International Conference on Intelligent Robots and Systems; Oct. 11-15, 2009; 7 pages.

Dowling et al.; "Intelligent Image Processing Constraints for Blind Mobility Facilitated Through Artificial Vision"; 8th Australian and NewZealand Intelligent Infoimation Systems Conference (ANZIIS); Dec. 10-12, 2003; 7 pages.

Ebay; Matin (Made in Korea) Neoprene Canon DSLR Camera Curved Neck Strap #6782; http://www.ebay.com/itm/MATIN-Made-in-Korea-Neoprene-Canon-DSLR-Camera-Curved-Neck-Strap-6782/281608526018?hash=item41912d18c2:g:~pMAAOSwe-FU6zDa ; 4 pages.

Eccles, Lisa; "Smart Walker Detects Obstacles"; Electronic Design; http://electronicdesign.com/electromechanical/smart-walker-detects-obstacles; Aug. 20, 2001; 2 pages.

Frizera et al.; "The Smart Walkers as Geriatric Assistive Device. The SIMBIOSIS Purpose"; Gerontechnology, vol. 7, No. 2; Jan. 30, 2008; 6 pages.

Garaj et al.; "A System for Remote Sighted Guidance of Visually Impaired Pedestrians"; The British Journal of Visual Impairment; vol. 21, No. 2, 2003; 9 pages.

Ghiani, et al.; "Vibrotactile Feedback to Aid Blind Users of Mobile Guides"; Journal of Visual Languages and Computing 20; 2009; 13 pages.

Glover et al.; "A Robotically-Augmented Walker for Older Adults"; Carnegie Mellon University, School of Computer Science; Aug. 1, 2003; 13 pages.

Graf, Christian; "Verbally Annotated Tactile Maps—Challenges and Approaches"; Spatial Cognition VII, vol. 6222; Aug. 15-19, 2010; 16 pages.

Graft, Birgit; "An Adaptive Guidance System for Robotic Walking Aids"; Journal of Computing and Information Technology—CIT 17; 2009; 12 pages.

Greenberg et al.; "Finding Your Way: A Curriculum for Teaching and Using the Braillenote with Sendero GPS 2011"; California School for the Blind; 2011; 190 pages.

Guerrero et al.; "An Indoor Navigation System for the Visually Impaired"; Sensors vol. 12, Issue 6; Jun. 13, 2012; 23 pages.

Guy et al; "CrossingGuard: Exploring Information Content in Navigation Aids for Visually Impaired Pedestrians" Proceedings of the SIGCHI Conference on Human Factors in Computing Systems; May 5-10, 2012; 10 pages.

Hamid, Nazatul Naquiah Abd; "Facilitating Route Learning Using Interactive Audio-Tactile Maps for Blind and Visually Impaired People"; CHI 2013 Extended Abstracts; Apr. 27, 2013; 6 pages.

Helal et al.; "Drishti: An Integrated Navigation System for Visually Impaired and Disabled"; Fifth International Symposium on Wearable Computers; Oct. 8-9, 2001; 8 pages.

Hesch et al.; "Design and Analysis of a Portable Indoor Localization Aid for the Visually Impaired"; International Journal of Robotics Research; vol. 29; Issue 11; Sep. 2010; 15 pgs.

Heyes, Tony; "The Sonic Pathfinder an Electronic Travel Aid for the Vision Impaired"; http://members.optuszoo.com.au/aheyew40/pa/pf_blerf.html; Dec. 11, 2014; 7 pages.

Joseph et al.; "Visual Semantic Parameterization—To Enhance Blind User Perception for Indoor Navigation"; Multimedia and Expo Workshops (ICMEW), 2013 IEEE International Conference; Jul. 15, 2013; 7 pages.

Kalra et al.; "A Braille Writing Tutor to Combat Illiteracy in Developing Communities"; Carnegie Mellon University Research Showcase, Robotics Institute; 2007; 10 pages.

Kammoun et al.; "Towards a Geographic Information System Facilitating Navigation of Visually Impaired Users"; Springer Berlin Heidelberg; 2012; 8 pages.

(56) References Cited

OTHER PUBLICATIONS

Katz et al; "NAVIG: Augmented Reality Guidance System for the Visually Impaired"; Virtual Reality (2012) vol. 16; 2012; 17 pages.
Kayama et al.; "Outdoor Environment Recognition and Semi-Autonomous Mobile Vehicle for Supporting Mobility of the Elderly and Disabled People"; National Institute of Information and Communications Technology, vol. 54, No. 3; Aug. 2007; 11 pages.
Kirinic et al.; "Computers in Education of Children with Intellectual and Related Developmental Disorders"; International Journal of Emerging Technologies in Learning, vol. 5, 2010, 5 pages.
Krishna et al.; "A Systematic Requirements Analysis and Development of an Assistive Device to Enhance the Social Interaction of People Who are Blind or Visually Impaired"; Workshop on Computer Vision Applications for the Visually Impaired; Marseille, France; 2008; 12 pages.
Kumar et al.; "An Electronic Travel Aid for Navigation of Visually Impaired Persons"; Communications Systems and Networks (COMSNETS), 2011 Third International Conference; Jan. 2011; 5 pages.
Lee et al.; "Adaptive Power Control of Obstacle Avoidance System Using Via Motion Context for Visually Impaired Person." International Conference on Cloud Computing and Social Networking (ICCCSN), Apr. 26-27, 2012 4 pages.
Lee et al.; "A Walking Guidance System for the Visually Impaired"; International Journal of Pattern Recognition and Artificial Intelligence; vol. 22; No. 6; 2008; 16 pages.
Mann et al.; "Blind Navigation with a Wearable Range Camera and Vibrotactile Helmet"; 19th ACM International Conference on Multimedia; Nov. 28, 2011; 4 pages.
Mau et al.; "BlindAid: An Electronic Travel Aid for the Blind;" The Robotics Institute Carnegie Mellon University; 27 pages; May 2008.
Meijer, Dr. Peter B.L.; "Mobile OCR, Face and Object Recognition for the Blind"; The vOICe, www.seeingwithsound.com/ocr.htm; Apr. 18, 2014; 7 pages.
Merino-Garcia, et al.; "A Head-Mounted Device for Recognizing Text in Natural Sciences"; CBDAR'11 Proceedings of the 4th International Conference on Camera-Based Document Analysis and Recognition; Sep. 22, 2011; 7 pages.
Merri et al.; "The Instruments for a Blind Teacher of English: The challenge of the board"; European Journal of Psychology of Education, vol. 20, No. 4 (Dec. 2005), 15 pages.
NEWEGG; Motorola Behind the Neck Stereo Bluetooth Headphone Black/Red Bulk (S9)—OEM; http://www.newegg.com/Product/Product.aspx?Item=N82E16875982212&Tpk=n82e16875982212.
NEWEGG; Motorola S10-HD Bluetooth Stereo Headphone w/ Comfortable Sweat Proof Design; http://www.newegg.com/Product/Product.aspx?Item=9SIA0NW2G39901&Tpk=9sia0nw2g39901; 4 pages.
Nordin et al.; "Indoor Navigation and Localization for Visually Impaired People Using Weighted Topological Map"; Journal of Computer Science vol. 5, Issue 11; 2009; 7 pages.
OMRON; Optical Character Recognition Sensor User's Manual; 2012; 450 pages.
OrCam; www.orcam.com; Jul. 22, 2014; 3 pages.
Pagliarini et al.; "Robotic Art for Wearable"; Proceedings of EUROSIAM: European Conference for the Applied Mathematics and Informatics 2010; 10 pages.
Paladugu et al.; "GoingEasy® with Crowdsourcing in the Web 2.0 World for Visually Impaired Users: Design and User Study"; Arizona State University; 8 pages.
Park, Sungwoo; "Voice Stick"; vvww.yankodesign.com/2008/08/21/voice-stick; Aug. 21, 2008; 4 pages.
Parkes, Don; "Audio Tactile Systems for Designing and Learning Complex Environments as a Vision Impaired Person: Static and Dynamic Spatial Information Access"; EdTech-94 Proceedings; 1994; 8 pages.

Pawar et al.; "Multitasking Stick for Indicating Safe Path to Visually Disable People"; IOSR Journal of Electronics and Communication Engineering (IOSR-JECE), vol. 10, Issue 3, Ver. II; May-Jun. 2015; 5 pages.
Pawar et al.; "Review Paper on Multitasking Stick for Guiding Safe Path for Visually Disable People;" IJPRET; vol. 3, No. 9; pp. 929-936; 2015.
Pitsikalis et al. "Multimodal Gesture Recognition via Multiple Hypothese Rescoring." Journal of Machine Learning Research, Feb. 2015, pp. 255-284.
Ram et al.; "The People Sensor: A Mobility Aid for the Visually Impaired;" 2012 16th International Symposium on Wearable Computers; pp. 166-167; 2012.
Ramya, et al.; "Voice Assisted Embedded Navigation System for the Visually Impaired"; International Journal of Computer Applications; vol. 64, No. 13, Feb. 2013; 7 pages.
Ran et al.; "Drishti: An Integrated Indoor/Outdoor Blind Navigation System and Service"; Proceeding PERCOM '04 Proceedings of the Second IEEE International Conference on Pervasive Computing and Communications (PerCom'04); 2004; 9 pages.
Rentschler et al.; "Intelligent Walkers for the Elderly: Performance and Safety Testing of VA-PAMAID Robotic Walker"; Department of Veterans Affairs Journal of Rehabilitation Research and Development; vol. 40, No. 5; Sep./Oct. 2013; 9pages.
Rodriguez et al.; "Assisting the Visually Impaired: Obstacle Detection and Warning System by Acoustic Feedback"; Sensors 2012; vol. 12; 21 pages.
Rodriguez et al; "CrowdSight: Rapidly Prototyping Intelligent Visual Processing Apps"; AAAI Human Computation Workshop (HCOMP); 2011; 6 pages.
Rodriquez-Losada et al.; "Guido, the Robotic Smart Walker for the Frail Visually Impaired"; IEEE International Conference on Robotics and Automation (ICRA); Apr. 18-22, 2005; 15 pages.
Science Daily; "Intelligent Walker Designed to Assist the Elderly and People Undergoing Medical Rehabilitation"; http://vvww.sciencedaily.com/releases/2008/11/081107072015.htm; Jul. 22, 2014; 4 pages.
Shen et al. "Walkie-Markie: Indoor Pathway Mapping Made Easy," 10th USENIX Symposium on Networked Systems Design and Implementation (NSDI' 13); pp. 85-98, 2013.
Shoval et al.; "Navbelt and the Guidecane—Robotics-Based Obstacle-Avoidance Systems for the Blind and Visually Impaired"; IEEE Robotics & Automation Magazine, vol. 10, Issue 1; Mar. 2003; 12 pages.
Shoval et al.; "The Navbelt—A Computerized Travel Aid for the Blind"; RESNA Conference, Jun. 12-17, 1993; 6 pages.
Singhal; "The Development of an Intelligent Aid for Blind and Old People;" Emerging Trends and Applications in Computer Science (ICETACS), 2013 1[st International Conference]; pp. 182-185; Sep. 13, 2013.
Sudol et al.; "LookTel—A Comprehensive Platform for Computer-Aided Visual Assistance"; Computer Vision and Pattern Recognition Workshops (CVPRW), 2010 IEEE Computer Society Conference; Jun. 13-18, 2010; 8 pages.
The Nex Band; http://www.mightycast.com/#faq; May 19, 2015; 4 pages.
Treuillet; "Outdoor/Indoor Vision-Based Localization for Blind Pedestrian Navigation Assistance"; WSPC/Instruction File; May 23, 2010; 16 pages.
Trinh et al.; "Phoneme-based Predictive Text Entry Interface"; Proceedings of the 16th International ACM SIGACCESS Conference on Computers & Accessibility; Oct. 2014; 2 pgs.
Tu et al. "Crowdsourced Routing II D2.6" 34 pages; 2012.
Wang, et al.; "Camera-Based Signage Detection and Recognition for Blind Persons"; 13th International Conference (ICCHP) Part 2 Proceedings; Jul. 11-13, 2012; 9 pages.
Ward et al.; "Visual Experiences in the Blind Induced by an Auditory Sensory Substitution Device"; Journal of Consciousness and Cognition; Oct. 2009; 30 pages.
Wilson, Jeff, et al. "Swan: System for Wearable Audio Navigation"; 11th IEEE International Symposium on Wearable Computers; Oct. 11-13, 2007; 8 pages.

(56) References Cited

OTHER PUBLICATIONS

Wu et al. "Fusing Multi-Modal Features for Gesture Recognition," Proceedings of the 15th ACM on International Conference on Multimodal Interaction, Dec. 9, 2013, ACM, pp. 453-459.

Yabu et al.; "Development of a Wearable Haptic Tactile Interface as an Aid for the Hearing and/or Visually Impaired;" *NTUT Education of Disabilities*; vol. 13; pp. 5-12; 2015.

Yang, et al.; "*Towards Automatic Sign Translation*"; The Interactive Systems Lab, Carnegie Mellon University; 2001; 5 pages.

Yi, Chucai; "*Assistive Text Reading from Complex Background for Blind Persons*"; CBDAR'11 Proceedings of the 4th International Conference on Camera-Based Document Analysis and Recognition; Sep. 22, 2011; 7 pages.

Zeng et al.; "*Audio-Haptic Browser for a Geographical Information System*"; ICCHP 2010, Part II, LNCS 6180; Jul. 14-16, 2010; 8 pages.

Zhang et al.; "*A Multiple Sensor-Based Shoe-Mounted User Interface Designed for Navigation Systems for the Visually Impaired*"; 5th Annual ICST Wireless Internet Conference (WICON); Mar. 1-3, 2010; 9 pages.

Shidujaman et al.; "Design and navigation Prospective for Wireless Power Transmission Robot;" IEEE; Jun. 2015.

\* cited by examiner

WEARABLE COMPUTING DEVICE FOR DETECTING PHOTOGRAPHY

BACKGROUND

1. Field

The present disclosure relates to a wearable computing device to be worn around a neck of a user that is capable of determining aspects of photography when the user is the subject of the photography such as when a photograph is forthcoming and when the photograph has been completed.

2. Description of the Related Art

As computing power becomes faster and electronic devices become smaller, technology is being implemented in increasingly smaller packages. Technology is now at a point in which advanced computing functions can be implemented in devices sufficiently small to be worn by users as accessories. Wearable computing devices can perform functions for a user without requiring physical manipulation of the device by the user. Examples of wearable computing devices include eyeglasses, watches, and necklaces.

Some wearable computing devices have been designed with a particular category of users in mind. For example, some wearable computing devices have been specifically designed to provide assistance to users having physical disabilities such as visual impairment or hearing loss. These devices may include various components for detecting input data and various components for providing output data. These devices may also include a processor capable of analyzing the input data and determining output data to provide assistance to users based on the analyzed input data.

Certain tasks that individuals having a relatively good vision and hearing may not think twice about may be relatively difficult for individuals having visual impairment or hearing loss. The purpose of the wearable computing devices designed specifically for vision or hearing disabled individuals is to aid the individuals in performing such tasks. There are many such tasks, certain ones of which have not been provided by any wearable computing devices to date. For example, a vision disabled individual may have difficulty in determining when a photograph of the individual will be taken, which direction to turn to face the camera, and when the photograph has been completed.

Thus, there is a need in the art for wearable computing devices capable of determining when a photograph will be taken of a user, determining when the photograph has been completed, and facilitating alignment of the user with the camera.

SUMMARY

Described herein is a wearable computing device for detecting photography. The wearable computing device includes an outer casing designed to be worn by a user. The wearable computing device also includes a device camera coupled to the outer casing. The device camera is designed to detect image data corresponding to a person holding a remote camera in an environment of the wearable computing device. The wearable computing device also includes a mobile processor coupled to the device camera. The mobile processor is designed to determine that a photograph will be taken based on the image data corresponding to the person holding the remote camera. The wearable computing device also includes an output device coupled to the mobile processor. The output device is designed to output data indicating that the photograph of the wearable computing device will be taken.

Also described is a wearable computing device for detecting photography. The wearable computing device includes an outer casing designed to be worn by a user. The wearable computing device also includes a device camera coupled to the outer casing. The device camera is designed to detect image data corresponding to an amount of light present in an environment of the wearable computing device. Some of the light may correspond to a flash of a remote camera. The wearable computing device also includes a mobile processor coupled to the device camera. The mobile processor is designed to determine that a photograph has been taken when the amount of light present in the environment of the wearable computing device spikes. The wearable computing device also includes an output device coupled to the mobile processor. The output device is designed to output data indicating that the photograph of the wearable computing device has been taken.

Also described is a method for determining that a photograph of a user of a wearable computing device has been taken or will be taken. The method includes detecting, by a device camera, image data corresponding to at least one of a person holding a remote camera in an environment of the wearable computing device or an amount of light present in the environment of the wearable computing device. Some of the light may correspond to a flash of the remote camera. The method also includes determining, by a mobile processor coupled to the device camera, that the photograph of the user of the wearable computing device will be taken based on the image data corresponding to the person holding the remote camera. The method also includes outputting, by an output device coupled to the mobile processor, first output data indicating that the photograph of the user of the wearable computing device will be taken. The method also includes determining, by the mobile processor, that the photograph of the user of the wearable computing device has been taken based on at least one of the image data corresponding to the person holding the remote camera or the amount of light present in the environment of the wearable computing device. The method also includes outputting, by the output device, second output data indicating that the photograph of the user of the wearable computing device has been taken.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present invention provides wearable computing devices designed to alert vision and/or hearing impaired individuals to forthcoming photographs, to help such individuals align with a remote camera to improve their presence in the photograph, and to alert such individuals when the photograph has been completed. The wearable computing devices include one or more camera for detecting image data and one or more microphone for detecting audio data. A mobile processor of the wearable computing devices can analyze the detected image data and/or the detected audio data to determine if a photograph is forthcoming. If the photograph is forthcoming, the mobile processor may provide instructions to the user, via one or more output device, to help align the user with the remote camera. The mobile processor continues to analyze the image data and/or the audio data to determine when the photograph has been completed.

The wearable computing devices disclosed herein provide several benefits and advantages such notifying a user when a photograph of the user is forthcoming so that he can pose for the photograph. This is especially advantageous to users having impaired vision and/or hearing loss who may not otherwise be aware of the forthcoming photograph. In situations where a user indicates a desire to not be the subject of the photograph, the wearable computing devices can provide the benefit and advantage of generating a defensive light towards the remote camera to reduce the quality of the photograph of the user. The wearable computing devices provide the additional benefit and advantage of providing instructions to the user for the user to turn and face the remote camera when the user is not aligned with the remote camera, increasing the view of the user in the photograph. The wearable computing devices also provide the benefit and advantage of notifying a user when a photograph of the user has been completed so that the user knows he can move from his pose.

Figure 1:
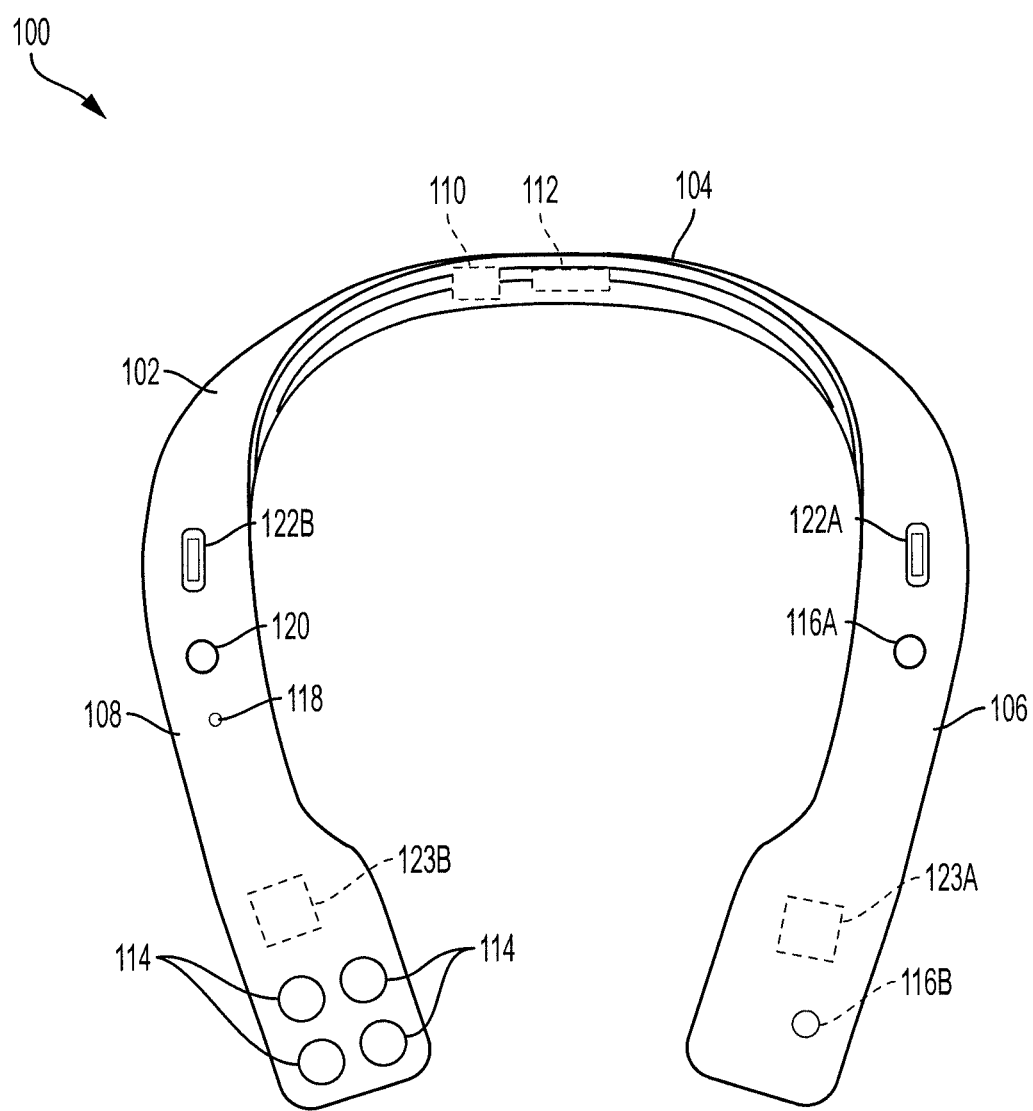
FIG. 1 is a perspective view of a wearable computing device designed to be worn around a neck of a user and having features and components for detecting photography of the user according to an embodiment of the present invention.

Turning to FIG. 1, a wearable computing device 100 has an outer casing 102 having a shape designed to be worn by a user. In particular, the outer casing 102 has a neck portion 104 designed to rest against a back of a neck of the user. The outer casing 102 also includes a first side portion 106 and a second side portion 108 each configured to extend across shoulders of the user and to rest on a front of the user. In that regard, the wearable computing device 100 may be worn in a similar manner as a necklace.

The wearable computing device 100 includes a mobile processor 110 and a memory 112. In some embodiments, the mobile processor 110 and the memory 112 may be positioned in a cavity defined by the neck portion 104. The memory 112 may include any memory for storing non-transitory data including instructions to be performed by the mobile processor 110. The mobile processor 110 may receive inputs from various components of the wearable computing device 100 and may determine output data based on the various inputs. In particular, the wearable computing device 100 may be designed to provide aid to individuals having physical impairments such as a visual impairment, hearing loss, or the like. For example, the wearable computing device 100 may provide walking navigation instructions or object recognition information to a user.

The wearable computing device 100 may include multiple components capable of receiving or detecting input data. For example, the wearable computing device 100 may include one or more buttons 114, a stereo pair of cameras 116, and a microphone 118. Each of the buttons 114, the stereo pair of cameras 116, and the microphone 118 may be electrically coupled to the mobile processor 110 and mechanically coupled to the outer casing 102.

The buttons 114 may receive input from a user. For example, the wearable computing device 100 may operate in a plurality of modes. Each of the buttons 114 may correspond to one of the plurality of modes such that the wearable computing device 100 may operate in a particular mode when the corresponding button is selected. In some embodiments, the wearable computing device 100 may include additional or alternative input devices such as a touch screen, a dial, a keypad, or the like.

The stereo pair of cameras 116 may include a first camera 116A and a second camera 116B. The stereo pair of cameras 116 may be referred to as device cameras as they are electrically and mechanically coupled to the wearable computing device 100. Each of the first camera 116A and the second camera 116B may be capable of detecting image data corresponding to an environment of the wearable computing device 100. The first camera 116A and the second camera 116B may be spaced apart by a known distance. In that regard, the mobile processor 110 may receive image data from the stereo pair of cameras 116 and may determine depth information corresponding to objects in the environment based on the received image data and the known distance between the first camera 116A and the second camera 116B. In some embodiments, the wearable computing device 100 may include one or more additional or alternative cameras. For example, the wearable computing device 100 may include a single camera instead of the stereo pair of cameras 116.

The microphone 118 may be capable of detecting audio data corresponding to the environment of the wearable computing device 100. For example, the microphone 118 may be capable of detecting speech data corresponding to speech of the user or of another person. In some embodiments, the user may provide input data to the mobile processor 110 by speaking commands that are received by the microphone 118. The microphone 118 may also be capable of detecting other sounds in the environment such as a sound corresponding to a flash of a camera, a sound corresponding to a shutter of a camera moving, or the like.

The wearable computing device 100 may also include a light source 120. The light source 120 may be electrically coupled to the mobile processor 110 and mechanically coupled to the outer casing 102. The light source 120 may generate light based on an instruction from the mobile processor 110.

The wearable computing device 100 may include output units 122 including a first output unit 122A and a second output unit 122B. The output units 122 may each be electrically coupled to the mobile processor 110 and mechanically coupled to the outer casing 102. Each of the output units 122 may output data based on an instruction from the mobile processor 110. Each of the output units 122 may include at least one of a speaker or a vibration unit. In some embodiments, the wearable computing device 100 may include separate speakers and vibration units, may include only speakers or vibration units, may include only one speaker, may include only one vibration unit, or the like. For example, the first output unit 122A and the second output unit 122B may be speakers and the wearable computing device 100 may also include separate vibration units 123 including a first vibration unit 123A and a second vibration unit 123B.

The speakers of the output units 122 are designed to output audio data. The vibration units 123 may include a motor and are designed to output haptic feedback such as vibrations. Because the first output unit 122A and the first vibration unit 123A are positioned on the first side portion 106 of the outer casing 102 and the second output unit 122B and the second vibration unit 123B are positioned on the second side portion 108 of the outer casing 102, the output units 122 and vibration units 123 may output stereo information. For example, the mobile processor 110 may control a vibration unit 123B on a right side of the user to vibrate in order to instruct the user to turn right.

Figure 2:
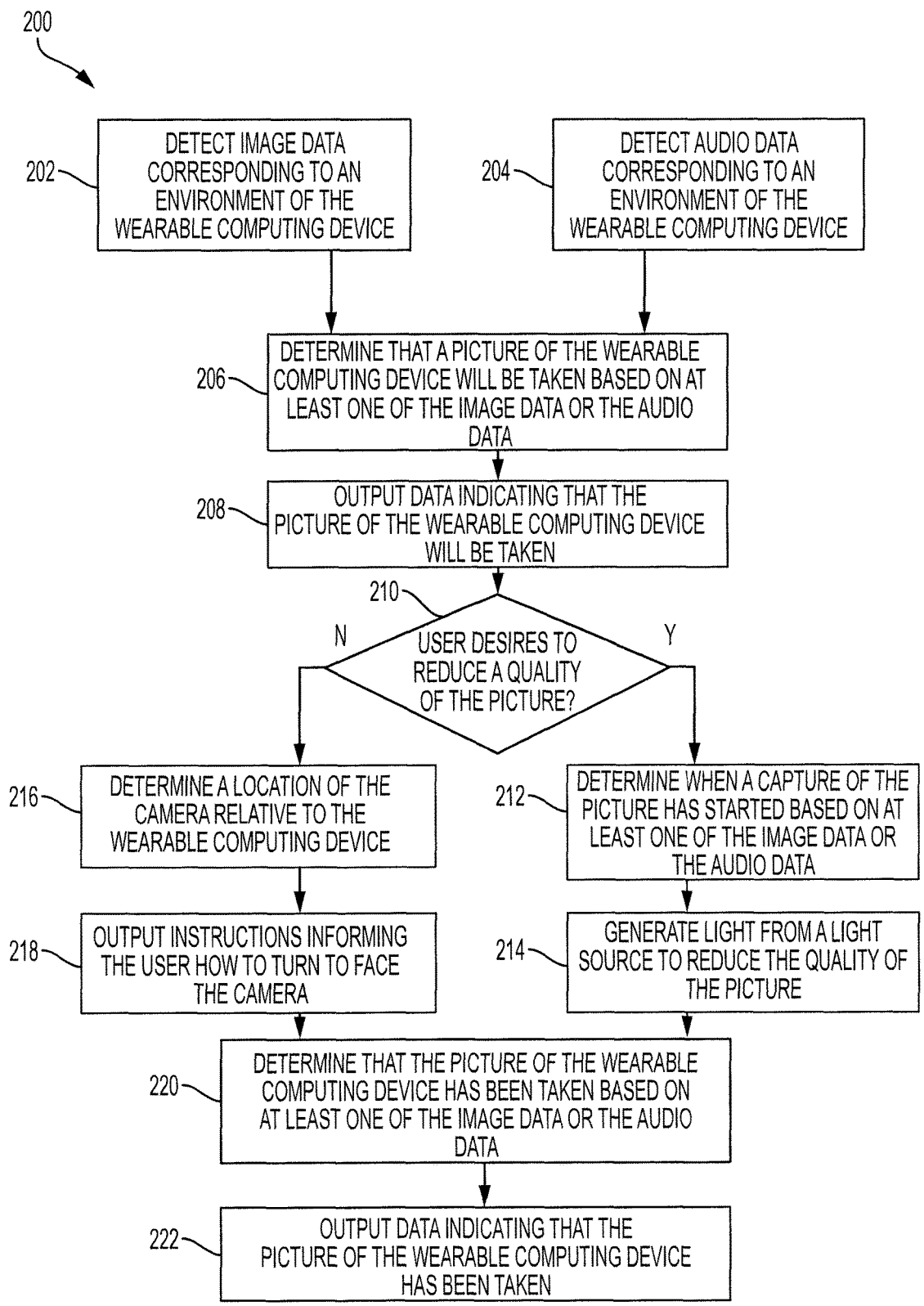
FIG. 2 is a flowchart illustrating a method for alerting a user of a wearable computing device when a photograph of the user is forthcoming or has been completed according to an embodiment of the present invention.

Turning now to FIG. 2, a method 200 for alerting a user when a photograph of the user is forthcoming or has occurred is shown. The method 200 may be performed by a wearable computing device such as the wearable computing device 100 of FIG. 1. For example, data may be detected by the stereo cameras 116 and/or the microphone 118. The mobile, processor 110 may determine whether a photograph is forthcoming or has been taken based on the detected data. The output units 122 may output data corresponding to the forthcoming or already taken photograph.

In block 202, one or more cameras of the wearable computing device may detect image data corresponding to an environment of the wearable computing device. The image data may include data corresponding to people and objects within a field of view of the one or more cameras and/or people and objects within a predetermined distance of the one or more cameras. For example, the image data may include data corresponding to a flash from flash photography, an image of a person holding a camera, or the like.

In some embodiments, a microphone of the wearable computing device may detect audio data corresponding to the environment of the wearable computing device in block 204. For example, the audio data may include a sound of a flash of a camera loading up, a sound of a camera shutter opening and/or closing, speech data, or the like.

In block 206, a mobile processor of the wearable computing device may determine that a photograph of the wearable computing device may be forthcoming based on at least one of the image data or the audio data. The mobile processor may analyze the detected data for one or more cues indicating that the photograph of the wearable computing device may be forthcoming.

Figure 3:
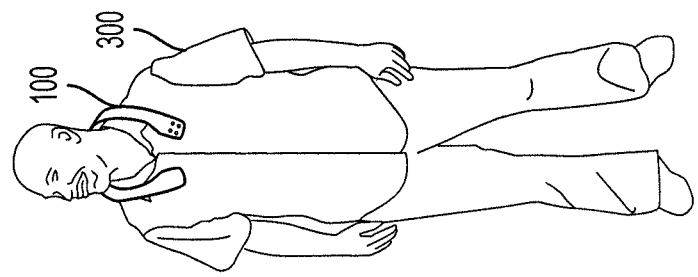
FIG. 3 is a drawing of a user of the wearable computing device of FIG. 1 and a photographer preparing to take a photograph of the user and illustrates various manners in which the wearable computing device can determine when the photograph of the user is forthcoming based on image data according to an embodiment of the present invention.
Figure 3:
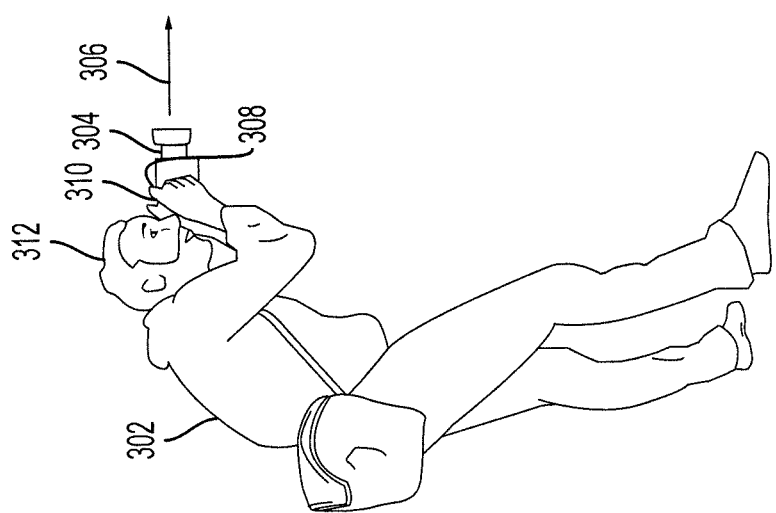

Referring to FIGS. 1 and 3, examples of cues indicating that a photograph of the wearable computing device 100 may be forthcoming are shown. A user 300 is wearing the wearable computing device 100. A photographer 302 is holding a remote camera 304 that is separate from the wearable computing device 100. Some cues shown in FIG. 3 include that the remote camera 304 has an orientation 306 directed towards the user 300. Furthermore, a finger 308 of the photographer 302 is positioned relatively close to a button 310 of the remote camera 304. Additionally, a head 312 of the photographer 302 is positioned relatively close to the camera 304.

One or more of the device cameras 122 of the wearable computing device 100 may detect one or more of the orientation 306 of the remote camera 304, the location of the finger 308 relative to the button 310, the location of the head 312 relative to the remote camera 304, or other data indicative of a forthcoming photograph by the remote camera 304. The mobile processor 110 may receive and analyze this detected data.

The mobile processor 110 may determine the orientation 306 of the camera 304 relative to the wearable computing device 100 by analyzing the image data. In some embodiments, the mobile processor 110 may use image recognition to determine that a lens of the remote camera 304 has a certain shape and may determine the orientation 306 based on the location of the lens of the remote camera 304. In some embodiments, the mobile processor may be aware of other features of the remote camera 304 that can be analyzed to determine the orientation 306, such as the fact that a direction of a distal end of a long tubular structure (the lens being at the distal end of the tube) indicates the orientation 306. When the remote camera 304 is oriented in a direction towards the wearable computing device 100, the mobile processor 110 may determine that a photograph of the user 300 is forthcoming. For example, the mobile processor 110 may determine that the photograph is forthcoming when the wearable computing device 110 is within a predetermined angle, such as 40 degrees, 60 degrees, or 90 degrees, of the orientation 306 of the remote camera 304.

Further based on the analysis of the image data, the mobile processor 110 may determine a relative distance between the finger 308 of the photographer 302 and the button 310 of the remote camera 304. In some embodiments, the device cameras 122 may not be capable of detecting the button 310. In that regard, the mobile processor 110 may also or instead determine a relative distance between the finger 308 another portion of the remote camera 304. In some embodiments, the mobile processor 110 may analyze the image data and estimate the location of the button 310 on the remote camera 304. The mobile processor 110 may then determine a relative distance between the finger 308 and the estimated location of the button 310. When the relative distance between the finger 308 and at least one of the determined location of the button 310, the estimated location of the button 310, or another portion of the remote camera 304 is within a predetermined distance, the mobile processor 110 may determine that a photograph is forthcoming.

Also based on the analysis of the image data, the mobile processor 110 may determine a relative distance between the head 312 of the photographer 302 and the remote camera 304. In some embodiments, the mobile processor 110 may also or instead determine whether the head 312 of the photographer 302 is aligned with the remote camera 304. For example, the mobile processor 110 may determine whether the remote camera 304 is positioned in front of the head 312 of the photographer 302. In some embodiments, the mobile processor 110 may determine a location of eyes of the photographer 302 relative to the remote camera 304. When the head 312 of the photographer 302 is within a predetermined distance of the remote camera 304, the mobile processor 110 may determine that a photograph is forthcoming. Furthermore, when the head 312 of the photographer 302 is aligned with the remote camera, the mobile processor 110 may determine that a photograph is forthcoming. Similarly, when one or more eyes of the photographer 302 are within a predetermined distance of the remote camera 304 or one or more eyes of the photographer 302 are aligned with the remote camera, the mobile processor 110 may determine that a photograph is forthcoming.

Figure 4:
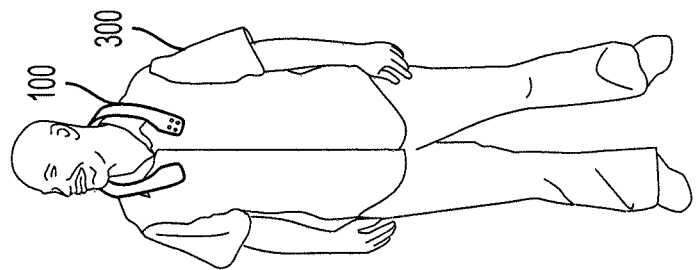
FIG. 4 is a drawing of a user of the wearable computing device of FIG. 1 and a photographer preparing to take a photograph of the user and illustrates various manners in which the wearable computing device can determine when the photograph of the user is forthcoming based on audio data according to an embodiment of the present invention.
Figure 4:
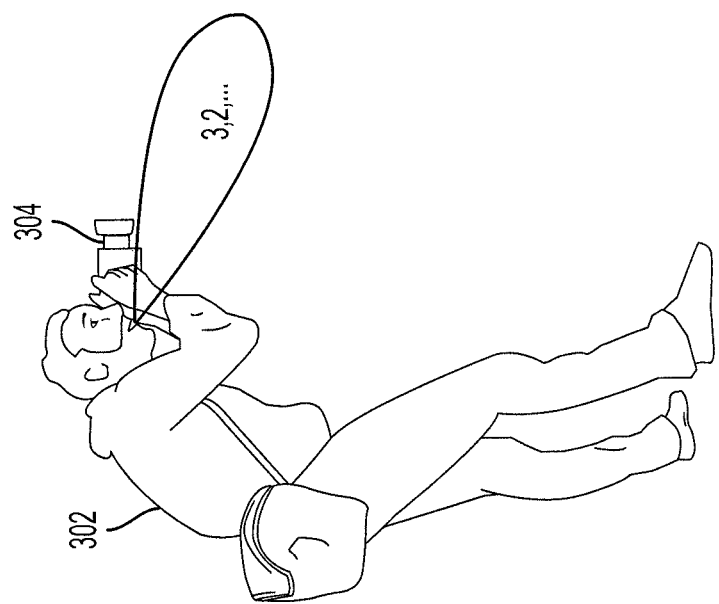

Referring to FIGS. 1 and 4, another example of determining that a photograph of the wearable computing device 100 may be forthcoming is shown. The user 300 is wearing the wearable computing device 100 and the photographer 302 is holding the camera 304. Often, before taking a photograph, a photographer may give a verbal cue as to the timing of the upcoming photograph. For example and as shown in FIG. 4, the photographer 302 may count down from a predetermined number, indicating that the photograph will be taken at the end of the countdown. As another example, the photographer 302 may say "cheese" immediately prior to taking a photograph.

In some embodiments, the photographer 302 may use a flash of the camera 304 when taking the photograph. Flashes of some cameras make an identifiable sound when loading up prior to the flash. Thus, the sound of the flash loading up may indicate that a photograph is forthcoming.

The microphone 118 of the wearable computing device 100 may detect the speech data or the sound of the flash loading up. The mobile processor 110 may receive and analyze this detected data. Based on the analysis of this audio data, the mobile processor 110 may determine when the photograph is forthcoming. For example, the mobile processor 110 may determine that a photograph is forthcoming when a countdown is occurring, when a photographer says "cheese," when flash of a camera makes a sound corresponding to loading up, or the like.

Returning to FIG. 2, after the mobile processor has determined that a photograph of the wearable computing device is forthcoming, the mobile processor may control one or more output devices to output a first data indicating that the photograph is forthcoming. For example, one or more speaker of the wearable computing device may output speech data indicating that the photograph is forthcoming. As another example, a specific vibrational pattern by one or more vibration units may indicate that the photograph is forthcoming. For example, a pattern of short vibrations on both sides of the wearable computing device may indicate that the photograph is forthcoming.

In some embodiments, the mobile processor may determine when the photograph will be taken. For example, the mobile processor may receive detected audio data corresponding to a countdown or corresponding to the word "cheese." The mobile processor may also control one or more output device to output data indicating the timing of the photograph. For example, the mobile processor may control vibration units to output vibrations having an increasing or decreasing intensity or frequency to function as a countdown until the photograph occurs. This may be especially beneficial for deaf users as they may be unable to hear the verbal cues.

In some embodiments, the wearable computing device may request feedback regarding whether the user desires to be in the photograph. The user may provide this input using an input device, such as the buttons 114 of FIG. 1. In some embodiments, a user may be able to pre-program the wearable computing device to indicate that he or she does not desire to be the subject of any photographs. In some embodiments, the user may provide this input upon receiving feedback that the photograph is forthcoming. Thus, in block 210, the mobile processor may determine whether the user desires to not be the subject of any photographs.

In block 212, if the user desires to reduce the quality of the photograph, the mobile processor may determine when a capture of the picture has started based on at least one of the image data or the audio data. The mobile processor may generate a defensive light in response to determining that the capture of the picture has started. In some embodiments, block 212 may not be performed and the defensive light may be generated when the mobile processor determines that the picture of the device will be taken in block 206.

For example, the mobile processor may determine that the capture has started when the image data indicates that the finger of the photographer is near the button of the camera or indicates that the finger has begun to depress the button of the camera. The mobile processor may determine that the capture has started when the image data indicates that a flash has been generated from the remote camera. Similarly, the mobile processor may determine that the capture has started when the audio data indicates that the flash has been generated from the remote camera.

The mobile processor may also determine that the capture has started when a combination of actions is detected. For example, the mobile processor may determine that the capture has started when a photographer moves a camera in front of his face and places his finger on the button.

In block 214, after determining that the picture will be taken or that the capture of the picture has started, the mobile processor may generate light from a light source to reduce the quality of the picture. Although the wearable computing device may not be able to completely eliminate the user from the photograph, the wearable computing device may be capable of reducing a quality of the photograph. When a photograph is taken of a relatively bright light source, the light from the light source obscures the remainder of the photograph. Thus, by generating light, the wearable computing device will reduce the quality of the photograph of the user.

In some embodiments, the mobile processor may control the light from the light source to generate light until the image data or audio data indicates that the picture of the wearable computing device has been taken in block 220. In some embodiments, the mobile processor may control the light from the light source to generate light for a predetermined amount of time, such as one second, or five seconds, or thirty seconds, or the like. In some embodiments, the mobile processor may control the light source to generate light until another action is performed such as the photographer turning away from the wearable computing device or putting the camera away in a pocket or case.

In some embodiments and referring to FIG. 1, the light source 120 may be coupled to an actuator that can change the orientation of the light source 120 relative to the outer casing 102. In that regard, the mobile processor 110 may be capable of determining a direction of a remote camera relative to the wearable computing device 100. When the mobile processor 110 determines that a photograph taken by a remote camera is forthcoming, the mobile processor 110 may control the light source 120 to generate light and to be oriented towards the remote camera. Thus, when the user desires to reduce a quality of a forthcoming photograph, the mobile processor 110 may reduce the quality of the photograph by generating light and, in some embodiments, may cause the light to be oriented directly towards the remote camera.

Figure 5:
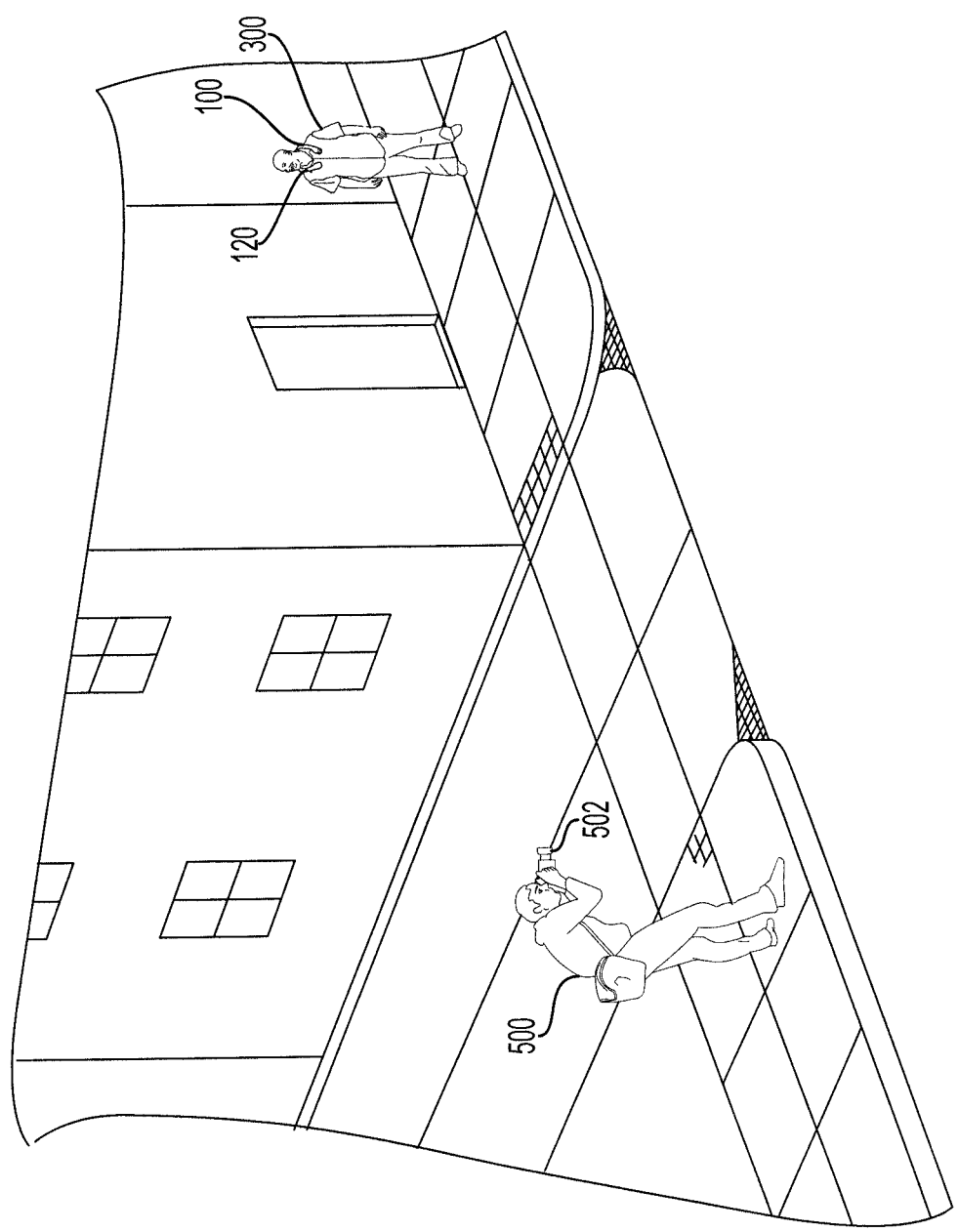
FIG. 5 is a drawing of a user of the wearable computing device of FIG. 1 and a photographer preparing to take an unwanted photograph of the user and illustrates use of a defensive light to reduce a quality of the unwanted photograph according to an embodiment of the present invention.

Referring now to FIGS. 1 and 5, a photographer 500 may be preparing to take a photograph of the user 300 using a remote camera 502. In this scenario, the user 300 may indicate to the wearable computing device 100 that the user desires to not be the subject of the photograph. When the mobile processor 110 determines that the photograph from the remote camera 502 is forthcoming, the mobile processor 110 may control the light source 120 to generate light. When the photographer 500 takes a photograph of the user 300 while the light source 120 is generating light, the light from the light source 120 will reduce the quality of the photograph as described above.

Returning to FIG. 2 and in some embodiments, the method 200 may be complete after block 214 is performed and, in some embodiments, the method 200 may proceed from block 214 to block 216.

In block 216, the mobile processor may determine a location of the remote camera relative to the wearable computing device. In some embodiments, the mobile processor may determine the location of the remote camera relative to the wearable computing device based on image data and/or audio data. For example, one or more device camera may detect that the remote camera is positioned 35 degrees to the right of the current orientation of the wearable computing device based on image data. As another example, the mobile processor may determine the location of the remote camera relative to the wearable computing device by triangulating a source of a countdown by a photographer if more than one microphone is included in the wearable computing device.

In some embodiments, the mobile processor may be capable of determining an orientation of a head of the user based on image data. In that regard, the mobile processor may determine the location of the remote camera relative to the orientation of the head of the user. For example, if the user is facing a certain direction, the wearable computing device may determine that the remote camera is positioned 25 degrees to the right of the current orientation of the head of the user.

If the user desires to be the subject of a photograph, the user may wish to be facing directly towards the remote camera. In that regard and in block 218, the mobile processor may control the output device to output instructions to the user for the user to turn to face the remote camera.

Returning reference to FIGS. 1 and 3, the mobile processor 110 may determine that the user 300, or a head of the user 300, is oriented to the left of the camera 304. Thus, the mobile processor 110 may control the output units 122 to output data informing the user to turn his body and/or his head in a particular direction to be aligned with the remote camera 304. For example, the mobile processor 110 may control the output units 122 to output audio data instructing the user 300 to turn to the right. In some embodiments, the audio data may provide a number of degrees for the user to turn, may provide clock face turning instructions (such as "turn to your 2 o'clock"), may provide a stereo tone (such as playing a tone on a right output unit indicating for the user to turn right and reducing a volume or frequency of the tone until the user 300 is aligned with the remote camera 304), or the like.

In some embodiments, the mobile processor 110 may control the output units 122 to output haptic feedback instructing the user to turn to the right. For example, the mobile processor 110 may control a vibration unit on a right output unit to vibrate, indicating that the user should turn right. In some embodiments, the mobile processor 110 may control the right vibration unit to vibrate with increasing or decreasing frequency as the user 300 becomes aligned with the camera 304, with the vibration ceasing when the user 300 is aligned with the camera 304.

Returning to FIG. 2, after the photograph of the user has been taken, the image data and/or the audio data may indicate that the photograph is complete. Thus, in block 220, the mobile processor may determine that the photograph of the wearable computing device has been taken based on the detected image data and/or based on the detected audio data.

Figure 6:
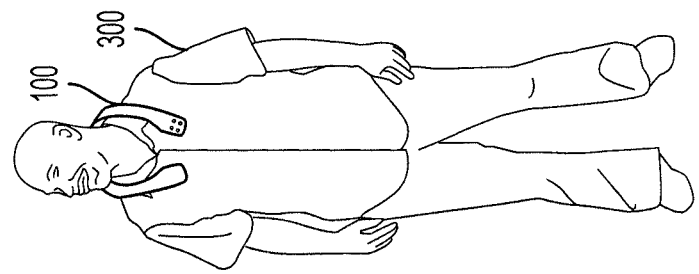
FIG. 6 is a drawing of a user of the wearable computing device of FIG. 1 and a photographer having taken a photograph of the user and illustrates various manners in which the wearable computing device can determine when the photograph of the user has been completed based on image data and audio data according to an embodiment of the present invention.
Figure 6:
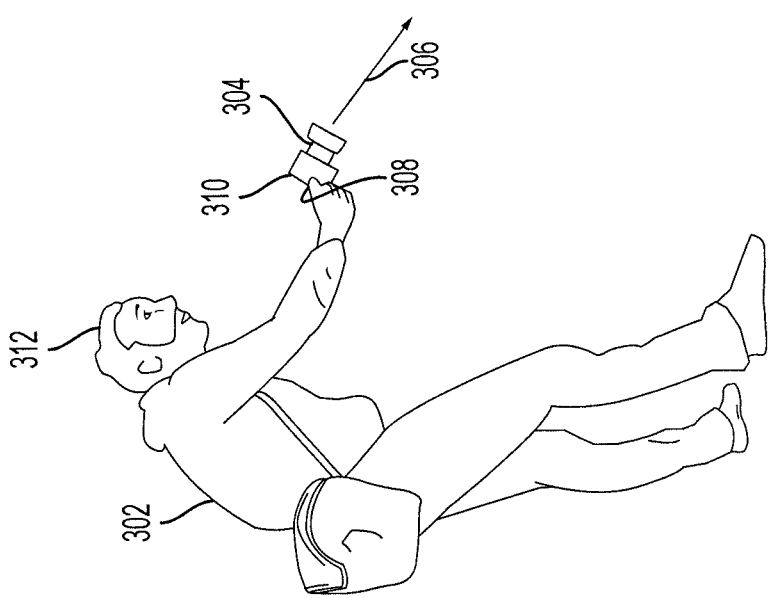

In some embodiments, the same data may be analyzed in block 220 as is analyzed in block 206. Referring now to FIGS. 1 and 6, examples of how the mobile processor 110 may determine when the photograph has been completed are shown. In FIG. 6, the remote camera 304 has been moved relative to its location in FIG. 3.

Based on newly detected image data, the mobile processor 110 may determine that the orientation 306 of the remote camera 304 is no longer directed towards the wearable computing device 100. Thus, the mobile processor 110 may determine that the photograph has been taken when the orientation 306 has been directed away from the wearable computing device 100. For example, the mobile processor 110 may determine that the photograph has been taken when the orientation 306 is first directed towards the wearable computing device 100 and then directed away from the wearable computing device. As another example, the mobile processor 110 may determine that the photograph has been taken when the orientation 306 is greater than a predetermined angle from the wearable computing device 100.

Furthermore, the finger 308 of the photographer 302 has been moved farther from the button 310. The device cameras 116 may detect that the finger 308 has moved away from the button 310 and the mobile processor 110 may determine that the photograph has been taken based on this detected movement. For example, when the finger 308 has moved away from the button 310 by the predetermined distance described above with reference to FIG. 3, the mobile processor 110 may determine that the photograph has been taken. As another example, the mobile processor 110 may determine that the photograph has been taken if the image data indicates that the finger 308 has depressed the button 310. As yet another example, the mobile processor 110 may determine that the photograph is been taken if the image data indicates that the finger 308 has begun moving away from the button 310.

Additionally, the remote camera 304 has been moved away from the head 312 of the photographer 302. The device cameras 116 may detect that the remote camera 304 has been moved farther from the head 312 and the mobile processor 110 may determine that the photograph has been taken based on this detected movement. For example, when the remote camera 304 has moved away from the head 312 by the predetermined distance described above with reference to FIG. 3, the mobile processor 110 may determine that the photograph has been taken. As another example, the mobile processor 110 may determine that the photograph has been taken when the remote camera 304 has begun moving away from the head 312.

The microphone 118 may detect the sound of a flash of the remote camera 304 flashing and/or the sound of a shutter of the remote camera 304 opening or closing. The mobile processor 110 may receive this detected data. The mobile processor 110 may determine that the photograph has been taken after the sound of the flash of the remote camera 304 has been detected and/or after the sound of the shutter of the remote camera 304 opening or closing has been detected.

As described above, the photographer 302 may provide verbal cues such as a countdown or saying the word "cheese." This data may be detected by the microphone 118 and provided to the mobile processor 110. The mobile processor 110 may determine when a photograph of the wearable computing device 100 is complete based on these verbal cues. In some embodiments, the mobile processor 110 may determine that the photograph has been taken when a predetermined amount of time has expired from a verbal cue. For example, the mobile processor 110 may determine that the photograph has been taken when two seconds has expired since the photographer 302 has said the word "cheese" or completed a countdown.

Returning briefly to FIG. 2, after determining that the picture of the wearable computing device has been taken, the mobile processor may cause an output unit of the wearable computing device to output data indicating that the picture of the wearable computing device has been taken in block 222. For example, a speaker may output audio data indicating that the picture has been taken. In some embodiments, the mobile processor may determine whether another picture is likely based on the image data or the audio data. In such embodiments, the speaker may also output data indicating that another picture is likely or is unlikely. The mobile processor may also cause a vibration unit to output data, such as a particular vibration or combination of vibrations, to indicate that the picture has been taken.

Figure 7:
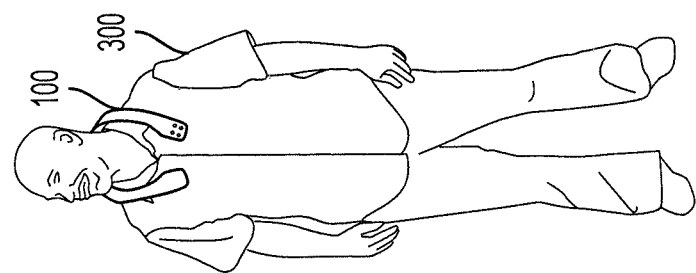
FIG. 7 is a drawing of a user of the wearable computing device of FIG. 1 and a photographer having taken a photograph of the user and illustrates various manners in which the wearable computing device can determine when the photograph of the user has been completed based on image data corresponding to a flash of a remote camera according to an embodiment of the present invention.
Figure 7:
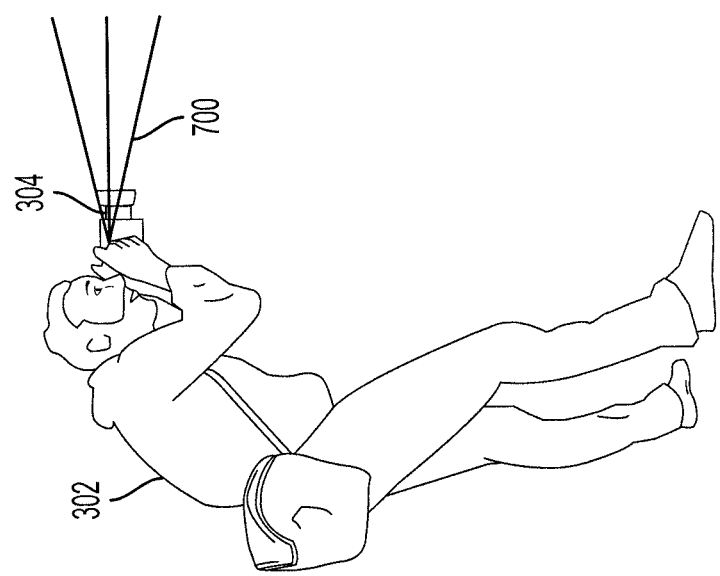

Turning now to FIGS. 1 and 7, the flash of the remote camera 304 may generate light 700 immediately prior to the photograph being taken. In that regard, one or more of the device cameras 116 may detect an ambient amount of light in the environment. When the flash of the remote camera 304 generates the light 700, the device cameras 116 may detect the spike in the amount of light in the environment. The mobile processor 110 of the wearable computing device 100 may determine that the spike of light corresponds to a flash from the remote camera 304.

In some embodiments, the mobile processor 110 may be designed to determine that a predetermined increase an amount of light in the environment corresponds to a camera flash. In some embodiments, the mobile processor 110 may be designed to determine that an increase of light in the environment for a predetermined amount of time or for a predetermined range of times corresponds to a camera flash. For example, a spike in ambient light that lasts for between 2 milliseconds and 1 second may correspond to a camera flash. In some embodiments, the mobile processor 110 may be designed to determine that light of a predetermined frequency and/or intensity corresponds to a camera flash.

After determining that the light 700 corresponds to the flash of the remote camera 304, the mobile processor 110 may determine that the photograph has been taken. In some embodiments, the mobile processor 110 may determine that the photograph has been taken immediately after determining that the light 700 corresponds to the flash of the remote camera 304. In some embodiments, the mobile processor 110 may determine that the photograph has been taken a predetermined amount of time, such as one second or three seconds, after determining that the light 700 corresponds to the flash of the remote camera 304.

Returning reference to FIG. 2, in some embodiments, the mobile processor may perform the function of block 214 in response to determining that a detected light corresponds to a flash of a remote camera. In that regard, if the user has indicated a desire to not be a subject of a photograph, the mobile processor may control a light source to generate light in response to determining that the camera has detected light corresponding to a camera flash.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A wearable computing device for detecting photography comprising:
   an outer casing configured to be worn by a user;
   a device camera coupled to the outer casing and configured to detect image data corresponding to a person holding a remote camera in an environment of the wearable computing device;
   a mobile processor coupled to the device camera and configured to determine that a photograph will be taken based on the image data corresponding to the person holding the remote camera, and determine a direction of the remote camera relative to the wearable computing device based on the image data corresponding to the person holding the remote camera; and
   an output device coupled to the mobile processor and configured to output data indicating that the photograph of the wearable computing device will be taken, the output device including at least one of a speaker configured to output audio data providing directions for the user to turn to face the remote camera or a pair of vibration units each positioned on one side of the outer casing and configured to output stereo haptic feedback in a pattern that provides directions for the user to turn to face the remote camera.

2. The wearable computing device of claim 1 wherein the device camera is further configured to detect image data corresponding to an orientation of the remote camera relative to the wearable computing device and the mobile processor is further configured to determine that the photograph will be taken when the detected orientation of the remote camera indicates that the remote camera is oriented towards the wearable computing device.

3. The wearable computing device of claim 1 wherein the device camera is further configured to detect at least one of image data corresponding to a location of a finger relative to a button of the remote camera or a location of the remote camera relative to a head of the person holding the remote camera, and the mobile processor is further configured to determine that the photograph will be taken when at least one of the finger is located within a first predetermined distance of the button of the remote camera or the remote camera is located within a second predetermined distance of the head of the person holding the remote camera.

4. The wearable computing device of claim 3 wherein:
the device camera is further configured to detect image data corresponding to an amount of light present in the environment of the wearable computing device that corresponds to a flash of the remote camera;
the mobile processor is further configured to determine that the photograph has been taken when at least one of:
the amount of light present in the environment of the wearable computing device spikes,
the finger has moved away from the button of the remote camera by at least the first predetermined distance, or
the remote camera has moved away from the head of the person holding the remote camera by at least the second predetermined distance; and
the output device is further configured to output data indicating that the photograph has been taken in response to the mobile processor determining that the photograph has been taken.

5. The wearable computing device of claim 1 further comprising a microphone configured to detect audio data corresponding to at least one of a verbal cue indicating that an image has been taken or will be taken or a sound of a flash or a shutter of the remote camera and wherein the mobile processor is further configured to determine that the photograph has been taken or determine that the photograph will be taken based on the detected audio data.

6. The wearable computing device of claim 1 further comprising:
an input device coupled to the mobile processor and configured to receive input from the user indicating a desire to reduce a quality of the photograph; and
a light source coupled to the mobile processor and configured to generate light,
wherein the mobile processor is further configured to cause the light source to generate the light to reduce the quality of the photograph based on the input from the user indicating the desire to reduce the quality of the photograph and based on the determination by the mobile processor that the photograph will be taken.

7. A wearable computing device for detecting photography comprising:
an outer casing configured to be worn by a user;
a device camera coupled to the outer casing and configured to detect image data corresponding to an amount of light present in an environment of the wearable computing device that corresponds to a flash of a remote camera;
a mobile processor coupled to the device camera and configured to determine that a photograph has been taken when the amount of light present in the environment of the wearable computing device spikes, and to determine a direction of the remote camera relative to the wearable computing device based on the image data corresponding to the amount of light present in the environment; and
an output device coupled to the mobile processor and configured to output data indicating that the photograph of the wearable computing device has been taken, the output device including at least one of a speaker configured to output audio data providing directions for the user to turn to face the remote camera or a pair of vibration units each positioned on one side of the outer casing and configured to output stereo haptic feedback in a pattern that provides directions for the user to turn to face the remote camera.

8. The wearable computing device of claim 7 wherein the mobile processor is further configured to differentiate between light of a camera flash and other types of light based on at least one of a frequency of detected light or a duration of the detected light.

9. The wearable computing device of claim 7 further comprising a microphone configured to detect audio data corresponding to at least one of a sound of the flash of the remote camera or a verbal cue indicating that the photograph has been taken or will be taken and wherein the mobile processor is further configured to determine that the photograph has been taken or determine that the photograph will be taken based on the detected audio data.

10. The wearable computing device of claim 9 wherein the verbal cue includes at least one of the word "cheese" or an increasing or decreasing numerical or alphabetical count.

11. The wearable computing device of claim 7 further comprising a light source coupled to the mobile processor and configured to generate light and wherein the mobile processor is further configured to cause the light source to generate the light in response to determining that the photograph has been taken in order to reduce a quality of the photograph.

12. The wearable computing device of claim 7 wherein:
the device camera is further configured to detect image data corresponding to a person holding the remote camera in the environment of the wearable computing device;
the mobile processor is further configured to determine that the photograph will be taken based on the detected image data corresponding to the person holding the remote camera; and
the output device is further configured to output data indicating that the photograph will be taken.

13. A method for determining that a photograph of a user of a wearable computing device has been taken or will be taken, comprising:
detecting, by a device camera, image data corresponding to at least one of a person holding a remote camera in an environment of the wearable computing device or an amount of light present in the environment of the wearable computing device that corresponds to a flash of the remote camera;
determining, by a mobile processor coupled to the device camera, that the photograph of the user of the wearable computing device will be taken based on the image data corresponding to the person holding the remote camera;
outputting, by an output device coupled to the mobile processor, first output data indicating that the photograph of the user of the wearable computing device will be taken;
determining, by the mobile processor, that the photograph of the user of the wearable computing device has been taken based on at least one of the image data corresponding to the person holding the remote camera or the amount of light present in the environment of the wearable computing device;
determining, by the mobile processor, a direction of the remote camera relative to the wearable computing device based on the image data corresponding to the person holding the remote camera;
outputting, by the output device, second output data indicating that the photograph of the user of the wearable computing device has been taken; and at least one of:
  outputting, by a speaker, audio data providing directions for the user to turn to face the remote camera, or
  outputting, by a pair of vibration units, stereo haptic feedback having a pattern that provides directions for the user to turn to face the remote camera.

14. The method of claim 13 further comprising:
detecting, by a microphone coupled to the mobile processor, audio data corresponding to at least one of a sound of the flash of the remote camera or a verbal cue indicating that the photograph has been taken or that the photograph will be taken; and
determining, by the mobile processor, that the photograph has been taken or that the photograph will be taken based on the detected audio data.

15. The method of claim 13 further comprising:
receiving, by an input device coupled to the mobile processor, input data indicating a desire to reduce a quality of the photograph; and
causing, by the mobile processor, a light source to generate light to reduce the quality of the photograph based on the input data and the determination by the mobile processor that the photograph has been taken or that the photograph will be taken.

16. The method of claim 13 further comprising:
detecting, by the device camera, image data corresponding to at least one of a finger relative to a button of the remote camera or a location of the remote camera relative to a head of the person holding the remote camera; and
determining, by the mobile processor, that the photograph will be taken when at least one of the finger is within a first predetermined distance of the button of the remote camera or the remote camera is within a second predetermined distance of the head of the person holding the remote camera.

* * * * *